US009183291B2

(12) United States Patent
Brown et al.

(10) Patent No.: US 9,183,291 B2
(45) Date of Patent: Nov. 10, 2015

(54) MOBILE CONTENT CAPTURE AND DISCOVERY SYSTEM BASED ON AUGMENTED USER IDENTITY

(75) Inventors: Stephen J. Brown, Woodside, CA (US); Andreas Schobel, San Francisco, CA (US)

(73) Assignee: Apple Inc., Cupertino, CA (US)

(*) Notice: Subject to any disclaimer, the term of this patent is extended or adjusted under 35 U.S.C. 154(b) by 973 days.

(21) Appl. No.: 13/349,733

(22) Filed: Jan. 13, 2012

(65) Prior Publication Data

US 2012/0110458 A1 May 3, 2012

Related U.S. Application Data

(63) Continuation-in-part of application No. 12/322,046, filed on Jan. 27, 2009, now Pat. No. 8,200,757.

(60) Provisional application No. 61/461,120, filed on Jan. 13, 2011.

(51) Int. Cl.
*G06F 15/16* (2006.01)
*G06F 17/30* (2006.01)

(52) U.S. Cl.
CPC .... *G06F 17/30731* (2013.01); *G06F 17/30575* (2013.01)

(58) Field of Classification Search
CPC ..................................................... H04L 51/04
USPC .................................................. 709/204, 203
See application file for complete search history.

(56) References Cited

U.S. PATENT DOCUMENTS

| 6,192,165 | B1 | 2/2001 | Irons et al. |
| 7,308,254 | B1 | 12/2007 | Rissanen |
| 7,499,567 | B2 | 3/2009 | Shimosato |
| 2005/0108686 | A1 | 5/2005 | White |
| 2006/0206564 | A1 | 9/2006 | Burns et al. |
| 2007/0118802 | A1 | 5/2007 | Gerace et al. |
| 2007/0245304 | A1 | 10/2007 | Curran |
| 2007/0298399 | A1 | 12/2007 | Shao et al. |
| 2008/0021976 | A1 | 1/2008 | Chen et al. |
| 2008/0034056 | A1 | 2/2008 | Renger et al. |
| 2008/0056574 | A1 | 3/2008 | Heck |
| 2008/0294607 | A1* | 11/2008 | Partovi et al. ..................... 707/3 |
| 2008/0294760 | A1* | 11/2008 | Sampson et al. .............. 709/223 |
| 2009/0006547 | A1 | 1/2009 | Banatwala |

* cited by examiner

*Primary Examiner* — Jason Recek
(74) *Attorney, Agent, or Firm* — Novak Druce Connolly Bove + Quigg LLP

(57) ABSTRACT

A system and a method is provided for collecting information and discovery of the information based on an augmented user identity. A note creation function allows a user of a computer device to create notes. A note interaction function allows the user to interact with notes and/or Cloud information available via the Internet. An annotation function annotates content to the notes, which could be context traits and/or user identity traits. User identity traits are augmented through information obtained from the creation process and/or the interaction process with notes or Cloud information. Using a discovery function, notes can be discovered for a user from a note database/store using aspects of the context traits and/or the augmented user identity traits.

16 Claims, 20 Drawing Sheets

MOBILE CONTENT CAPTURE AND DISCOVERY SYSTEM BASED ON AUGMENTED USER IDENTITY

CROSS-REFERENCE TO RELATED APPLICATIONS

This application claims priority from U.S. Provisional Patent Application 61/461,120 filed Jan. 13, 2011, which is incorporated herein by reference. This application is a continuation-in-part of U.S. patent application Ser. No. 12/322,046 filed Jan. 27, 2009 now U.S. Pat. No. 8,200,757, which is incorporated herein by reference.

FIELD OF THE INVENTION

The invention relates to systems and methods for capturing and discovering mobile content based on user identity.

BACKGROUND

Today, a tremendous number of online services and applications are available. The existing online services are related to virtually every aspect of life, including work, relationships, health, entertainment, news, etc. Access to these online services typically only requires an Internet connection. However, the abundance of services also causes information overload. As a result, disorganized information is floating around many users' lives and brains. Instead of positively influencing our lives, the services become cumbersome and are often neglected. In particular, the advent of social media has made it easier to share information with more people and make connections with people who we otherwise would not. However, the ubiquity of social media (such as through social networks) has created a further explosion in the information content of our lives and relationships. This information clutter reduces a user's productivity and shortens the user's attention span.

Typically, ideas begin with private thoughts that are later refined and shared to friends and, perhaps, the public at large. Who these ideas are to be shared with often evolve over time. Existing online services are not amenable to this process of developing ideas and deciding where to share them at a later time. For example, existing social media forces ideas immediately into the public domain. Information or media posted on social networks (e.g. Facebook.com, Twitter.com, and Flickr.com) or blogs (e.g. Wordpress.com and Blogger.com) are immediately accessible by other users. To post information in existing social media requires upfront cognitive decision-making related to the audience level of the information at the time the information was collected or generated. This process does not match the way human brains function.

Systems, such as emailing to oneself and note-taking applications (e.g. Evernote.com) exist for users to store private thoughts. However, these existing systems are not integrated with other services or applications. In other words, a user would have to access and sign on to multiple applications simultaneously to utilize information stored in the application storing the private thoughts. Because of the lack of integration and inconvenience of these systems, they are seldom used, therefore, ideas are often forgotten. In addition, existing note-taking applications require users to provide all of the information content to the note. By forcing a user to provide all of the information content, the note-taking process is typically tedious, error-prone, and incomplete.

The present invention addresses at least the above-described difficult problems and advances the art with a semantic note taking system and method.

SUMMARY OF THE INVENTION

The present invention is directed to a semantic note taking system and method for collecting information, enriching the information, and binding the information to services. A plurality of users are communicatively connected to an application server to create one or more notes that can be bound to one or more of a plurality of services and stored in a database. The application server operates a plurality of functions, including a note taking function for allowing each of the users to create one or more notes, a categorizing function for labeling each of the notes with one or more changeable categories, a context function for associating one or more context traits with each of the notes, a binding function to establish one or more changeable binding rules for each of the notes, wherein the binding rules determine one or more of the services where the note is to be bound, and wherein the binding rules are related to the content of the note, the categories of the note, the context traits of the note, a user binding selection, or any combination thereof, and a communication function for communicating each of the notes to one or more of the services where the note is to be bound.

A note includes text, audio media, visual media, audio-visual media, recorded data, a weblink, a pointer to an information source, or any combination thereof. In an embodiment, one or more of the context traits associated with the note includes a time, a location, physical data relating to the user device used to generate the note, or any combination thereof. In another embodiment, relevant data is derived based on one or more of the context traits and the relevant data is attached to the note. The relevant data can be derived by matching one or more of the context traits with data from an information module such as a calendar, an address book, a contact list, a user profile, a user history, or any combination thereof. In an embodiment, one or more of the context traits associated with the note is based on one or more categories of the note, the content of the note, a user history, or any combination thereof.

In a preferred embodiment, the binding rules include one or more publication properties, such as an audience level for the note and/or one or more locations to publish the note. The locations to publish the note can include a private domain of the user, one or more friends of the user, one or more computer-implemented social networks, a blog, an online discussion board, a website, or any combination thereof. In an embodiment, the binding rules are automatically determined based at least partially on one or more of the categories, one or more context traits, the note content, a user history, or any combination thereof.

The application server of an embodiment of the present invention operates a suggestion function for suggesting one or more services, binding rules, and/or categories. The suggestions can be based at least partially on one or more the categories, one or more of the context traits, the note content, a user history, one or more binding rules, or any combination thereof. In an embodiment, a note is automatically bound to one of the suggested services. Preferably, the suggestion function uses a user history of selections of services and/or categories.

In an embodiment of the present invention, a user interface is provided to allow user entry of the categories and binding rules for a note, wherein the user interface includes a first symbol associated with the categories of the note and a second symbol associated with the binding rules of the note. Preferably, the user entry of the first symbol triggers a display of one or more of the categories suggested to the user and selectable by the user. Similarly, the user entry of the second symbol triggers a display of one or more of the binding rules suggested to the user and selectable by the user. In another embodiment, a user interface corresponding to each of the services where a note can be bound is provided. Each of the service-specific user interfaces includes one or more buttons for initiating an action for the service corresponding to the user interface. Preferably, a single click of one of the buttons initiates creation of the note, automatic addition of content to the note, automatic labeling of the note with categories, and communication of the note to the service corresponding to the user interface.

In an embodiment, the user device operated by users to access the application server is a mobile device that communicates with the application server over a wireless network. The services where a note can be bound are selected from the group consisting of a website, a web application, a computer-implemented social network, a blog, a review website, a product review website, an entertainment website, a health application, a medical application, an online retailer, an email application, a research application, a clinical application, a calendar, and an address book.

In an additional embodiment, a system and a method is provided for collecting information and discovery of the information based on an augmented user identity. A note creation function allows a user of a computer device to create notes. Examples of notes are text, audio media, visual media, audio-visual media, recorded data, a weblink, a pointer to an information source, or any combination thereof. In one embodiment, the user defines the note to be a private note, (ii) a shared note to be shared among a group of friends over the Internet or (iii) a public note to be made publically available over the Internet. The notes can be stored in a note database/store which could contain notes from the user as well as notes from others. An interaction function allows the user to interact with the (stored) notes and/or with Cloud information. Cloud information, accessible via the Internet, could pertain to personal or private information of the user or others, information from friends or social groups, publically available information, or a combination thereof.

An annotation function is operable either on an application server or on the user computer device to associate or annotate information/content to the notes. In one aspect one or more context traits could be associated/annotated with the notes. Examples of such annotations are, for example, a location, a place, a time, a source, a related note, a person, people, a group, a tag, an identity, sensor data, a media file, an audio file, physical data relating to the computer device, derived data, or any combination thereof.

In another aspect, one or more user identity traits could be associated/annotated with the notes. User identity traits could be defined by the user, but could also be (preferably in an automatic fashion) augmented through information collected from and related to the creation process of notes, the interaction process with notes and/or Cloud information, or a combination thereof. In addition, such information could be related to personal content, privacy content, content from friends, global content, discovery terms, search terms, filter terms, or any combination thereof.

A note discovery function is provided to allow a user to discover notes from the note database. In the discovery process aspects of the context traits, the augmented user identity traits, or a combination thereof could be used to search or filter the database and retrieve the best matches for the user.

In one example one or more of services could be suggested and then (preferably automatically) bound to a created note, an interacted note, or a discovered note. Suggesting services could be at least partially based on one or more categories of the note, one or more of context traits of the note, one or more of the augmented user identity traits, the content of the note, a user history, or any combination thereof.

BRIEF DESCRIPTION OF THE FIGURES

The present invention together with its objectives and advantages will be understood by reading the following description in conjunction with the drawings, in which.

DETAILED DESCRIPTION OF THE INVENTION

The abundance of online services provides users with opportunities to perform many tasks and connect with numerous people from nearly any location. However, the large number of services often cause information overload and a user cannot efficiently organize the explosion of information content concerning the user's life, work, and relationships. The present invention is directed to a semantic note taking system and method to collect, enrich, and bind information to services. Semantic note taking allows users to effortless offload information from private thought streams for later determination of where to bind these thoughts. In addition, semantic note taking minimizes the friction to record and share ideas by automatically enriching the note and reducing unnecessary user input. In other words, the present invention is directed to a system and method to collect unscripted data, add more meaning and use out of the data, and bind the data to services.

Figure 1:
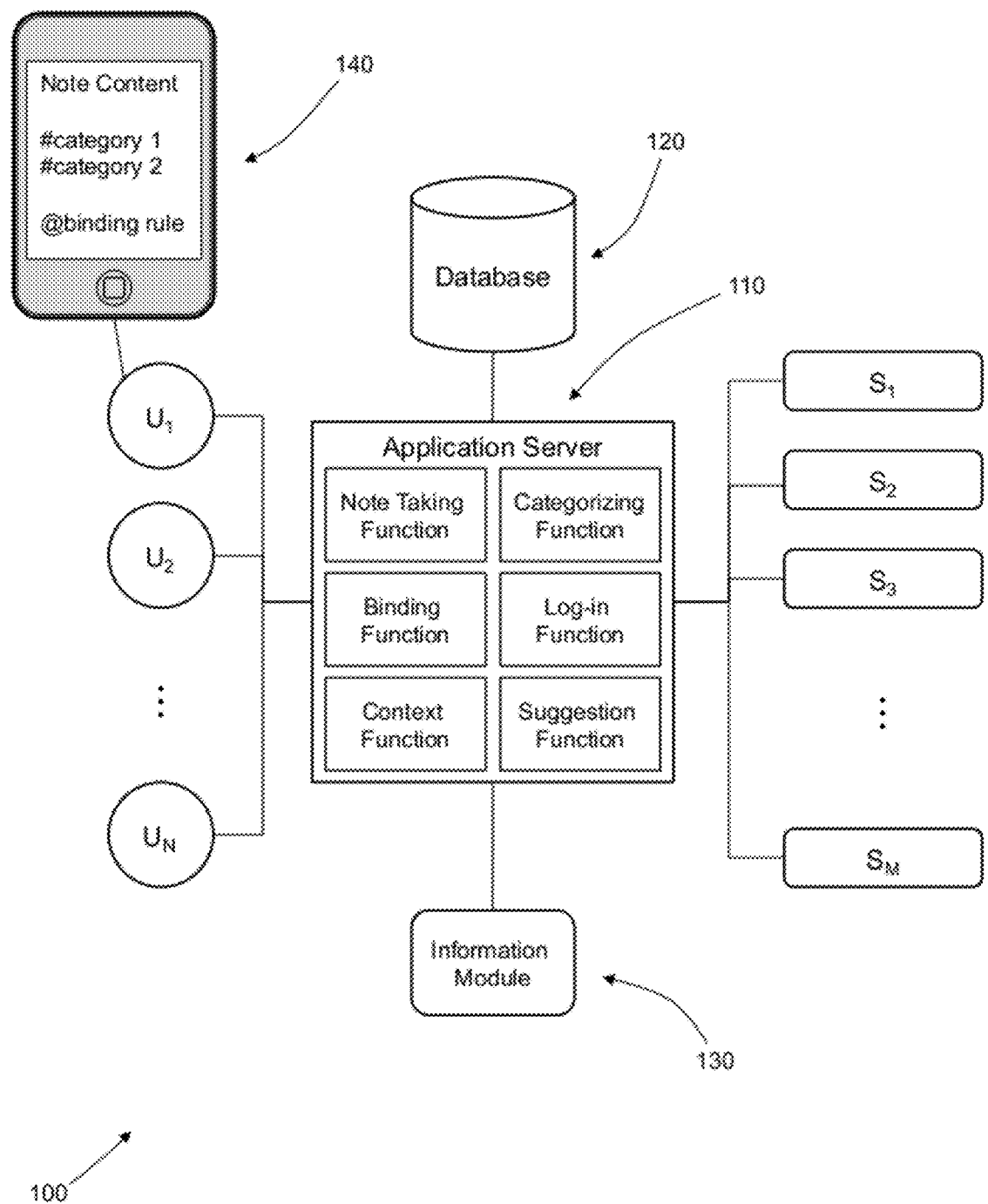
FIG. 1 shows an example of a semantic note taking system according to the present invention.

FIG. 1 shows a preferred embodiment of a semantic note taking system 100 according to the present invention. The semantic note taking system 100 includes an application server 110 that is accessible by a plurality of users $U_1$-$U_N$ for creating one or more notes, categorizing the notes, and binding the notes to one or more services $S_1$-$S_M$. The users $U_1$-$U_N$ connect to the application server 110 through any device capable of being communicatively connected to a network, such as the Internet. The user devices can include a computer, a laptop, a personal digital assistant (PDA), a cell phone, a mobile device, or a smart phone. FIG. 1 shows user $U_1$ with a mobile phone 140 that is connected to the application server 110, such as through a wireless network.

A note taking function, operated by the application server 110, allows each of the users $U_1$-$U_N$ to create one or more notes. Notes can include text, audio media, visual media, audio-visual media, recorded data, a weblink, a pointer to an information source (e.g. a bookmark), or any other type of data. Notes created by the users $U_1$-$U_N$ are transmitted from the user devices to the application server 110 and stored in the database 120 for later binding to one or more of the services $S_1$-$S_M$.

The application server 110 also operates a categorizing function to label the notes with one or more categories. In an embodiment, the categorizing function allows users $U_1$-$U_N$ to label the notes, though automatic or suggested note labeling is also possible. It is noted that one or more of the categories of each note is changeable. Labeling a note with categories enriches the note. The note is further enriched by the context function operated by the application server 110, which associates one or more context traits with the note. Context traits associated with a note can be based on one or more of the categories of the note, the content of the note, a user history, or any combination thereof. Examples of context traits include a time, a location, and physical data relating to the user device. For example, the mobile phone 140 of user $U_1$ is capable of measuring the location where the note was created (e.g. by using GPS measurements) and this location can be automatically associated with the note without user input, thereby enriching the note.

Context information is not restricted to a time-stamp or location-stamp associated with the note. In a preferred embodiment of the present invention, relevant data is derived based on one or more of the context traits. Relevant data can be derived by matching one or more of the context traits with data from an information module 130, such as a calendar, an address book, a contact list, a user profile, a user history, or any combination thereof. For example, a time context trait when the note is created is matched with a meeting time indicated by a calendar information module. Because the calendar includes relevant data, e.g. the participants of the meeting and the discussion topics of the meeting, this relevant data can be attached to the note to further enrich the note.

A binding function is provided to establish one or more binding rules for a note. The binding rules determine one or more services $S_1$-$S_M$ or applications where the note is to be bound. The binding rules are related to the content of the note, the categories of the note, the context traits of the note, a user binding selection, or any combination thereof. In an embodiment, the binding rules of a note are automatically determined based at least partially on one or more categories of the note, one or more context traits, the content of the note, the user history, or any combination thereof.

The services $S_1$-$S_M$ where a note can be bound can include a website, a web application, a computer-implemented social network, a blog, a review website, a product review website, an entertainment website, a health application, a medical application, an online retailer, an email application, a research application, a clinical application, a calendar, an address book, or any combination thereof. A note that is bound to a service is communicated to the service. What is done with the note after it is communicated depends on the particular functions of the service and the content of the note. For example, a note bound to a blog could be published on the blog and a note bound to a research application can include data for analysis by the research application. In addition to communicating a note to a service, in an embodiment of the present invention, data can be extracted from the service where the note is bound and the extracted data is added to the note.

The services $S_1$-$S_M$ shown in FIG. 1 are generally not integrated and some of the services $S_1$-$S_M$ where a note can be bound may also require user login or authentication. To facilitate the integration of the services and allow access to the services, in an embodiment, the application server 110 includes a login function to provide login information for access to the services. Integration of the services enables a user to collect or create information content and offload the content to a single location, instead of having to interact with a myriad of different services separately.

Figure 2:
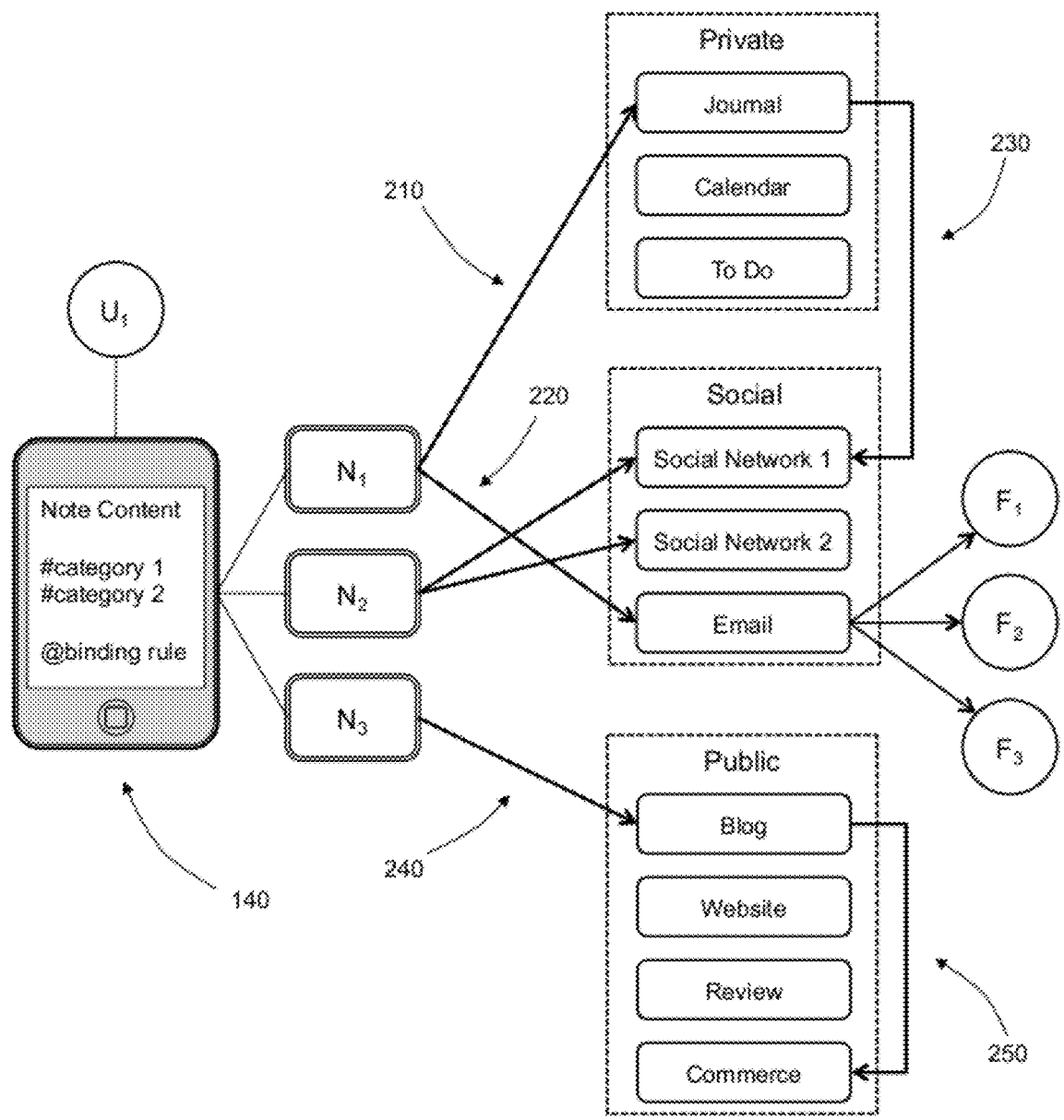
FIG. 2 shows an example of mutable binding of notes to multiple services according to the present invention.

In a preferred embodiment of the present invention, the binding rules comprise one or more publication properties. The publication properties include an audience or privacy level for the note and the location to publish the note. FIG. 2 shows three notes $N_1$, $N_2$, and $N_3$ created by user $U_1$ and the binding of these notes to different services. The audience levels generally include private, social, and public designations. The locations to publish the note includes a private domain of the user, one or more friends $F_1$-$F_3$ of the user, one or more computer-implemented social networks, a blog, an online discussion board, a website, or any combination thereof. FIG. 2 shows note $N_1$ bound 210 to a private journal and bound 220 to an email application. In other words, the binding rules for note $N_1$ indicate that the note should be communicated to the journal service and the email application with the appropriate audience levels.

A note can be bound to any number of services at any time. Importantly, the binding of the note is changeable. In other words, a user can change the binding rules to alter the location where a note is to be bound. In FIG. 2, note $N_1$ is originally bound 210 to a journal but is later bound 230 to Social Network 1. Similarly, note $N_3$ is originally bound 240 to a blog, but is later bound 250 to an electronic commerce website. The mutable binding rules and late-binding method of the present invention is in accord with how ideas are typically generated in our brains. In particular, ideas and information typically start as private thoughts that are later shared and discussed with people we know. Finally, the information is published to the world. This is in contrast to existing social media where generated media are forced immediately into the public realm.

FIG. 2 also shows note $N_1$ published and communicated to associates or friends $F_1$-$F_3$ of user $U_1$. By publishing note $N_1$ to friends $F_1$-$F_3$, an ad hoc community or an ad hoc social network is developed around note $N_1$. In an embodiment, one or more of the friends $F_1$-$F_3$ can change the note $N_1$. In particular, data can be extracted from one of the friends $F_1$-$F_3$ and the extracted data is added to the note $N_1$.

Figure 3:
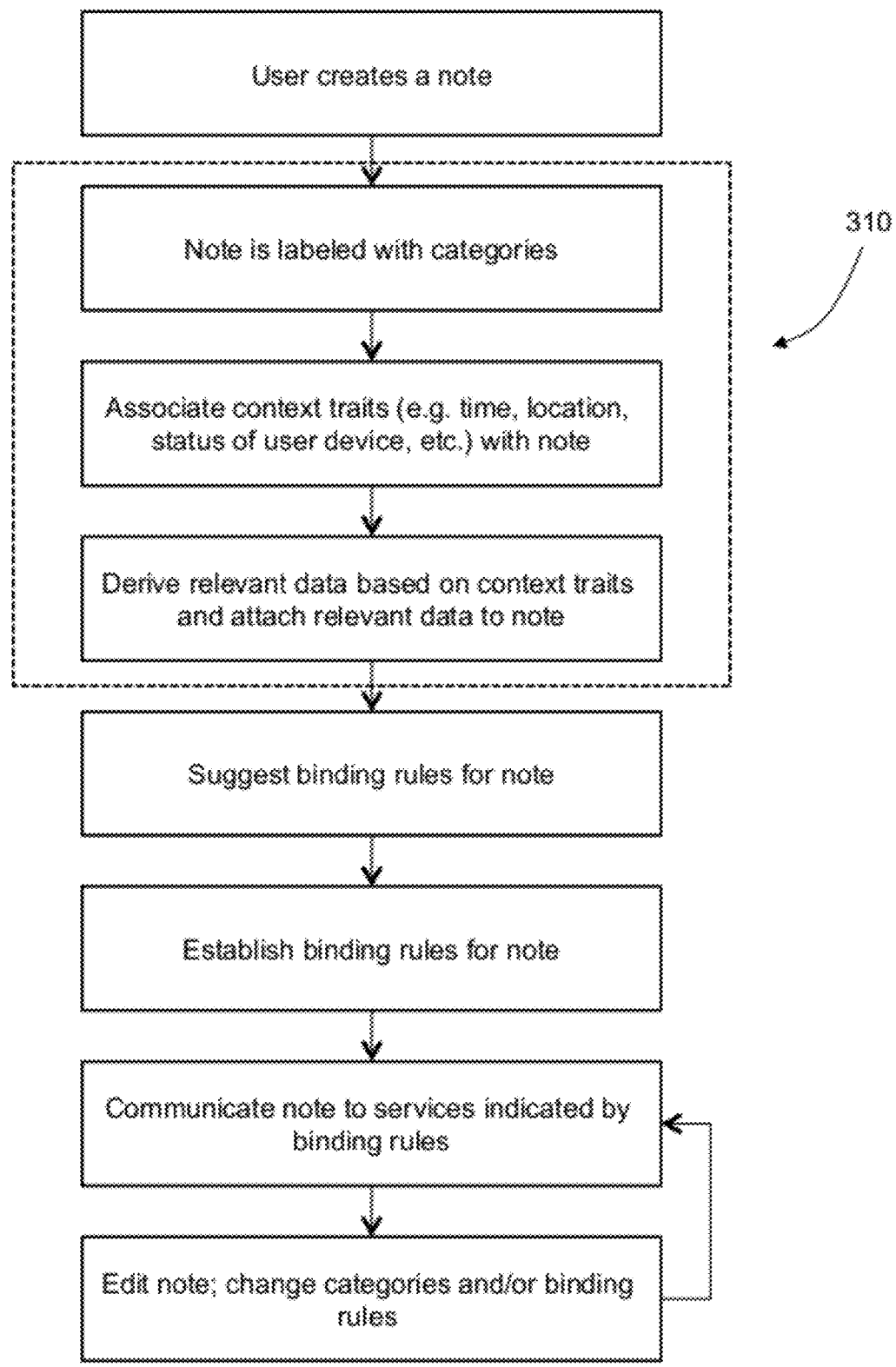
FIG. 3 shows a flow chart of an example note creation, enrichment, and binding according to the present invention.
Figure 4:
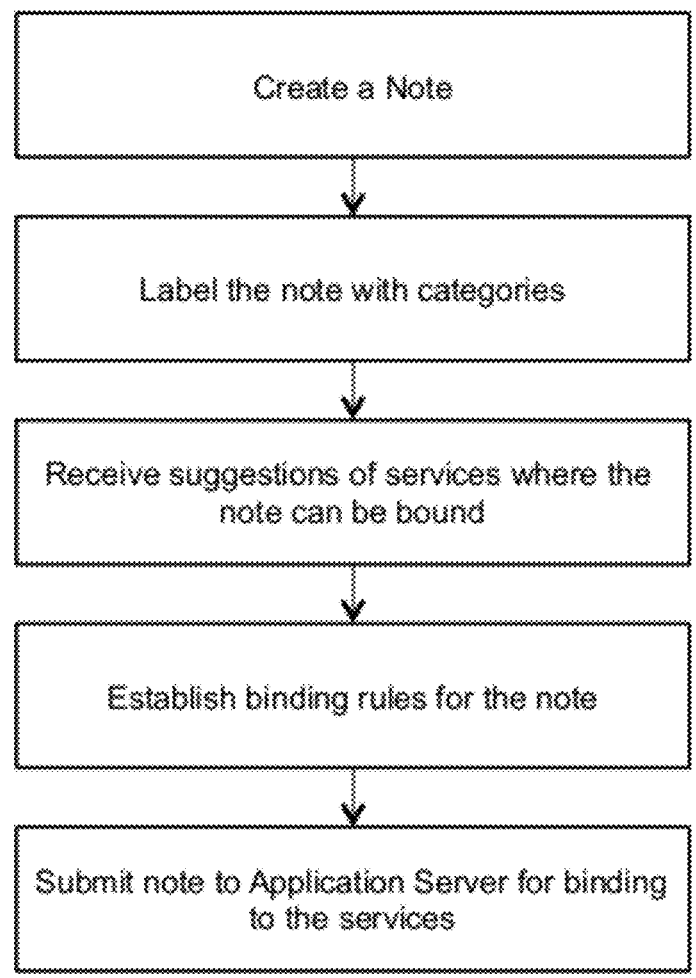
FIG. 4 shows a flow chart of example steps taken by a user according to the present invention.

FIGS. 3 and 4 show flow charts for exemplary methods of creating, enriching, and binding the notes according to the present invention. The steps circled with a dashed line 310 in FIG. 3 show the enrichment of the notes by labeling the note with categories, associating context traits with the note, and deriving relevant data based on the context traits. FIG. 4 shows the steps undertaken by a user of the semantic note taking system of the present invention.

Figure 5:
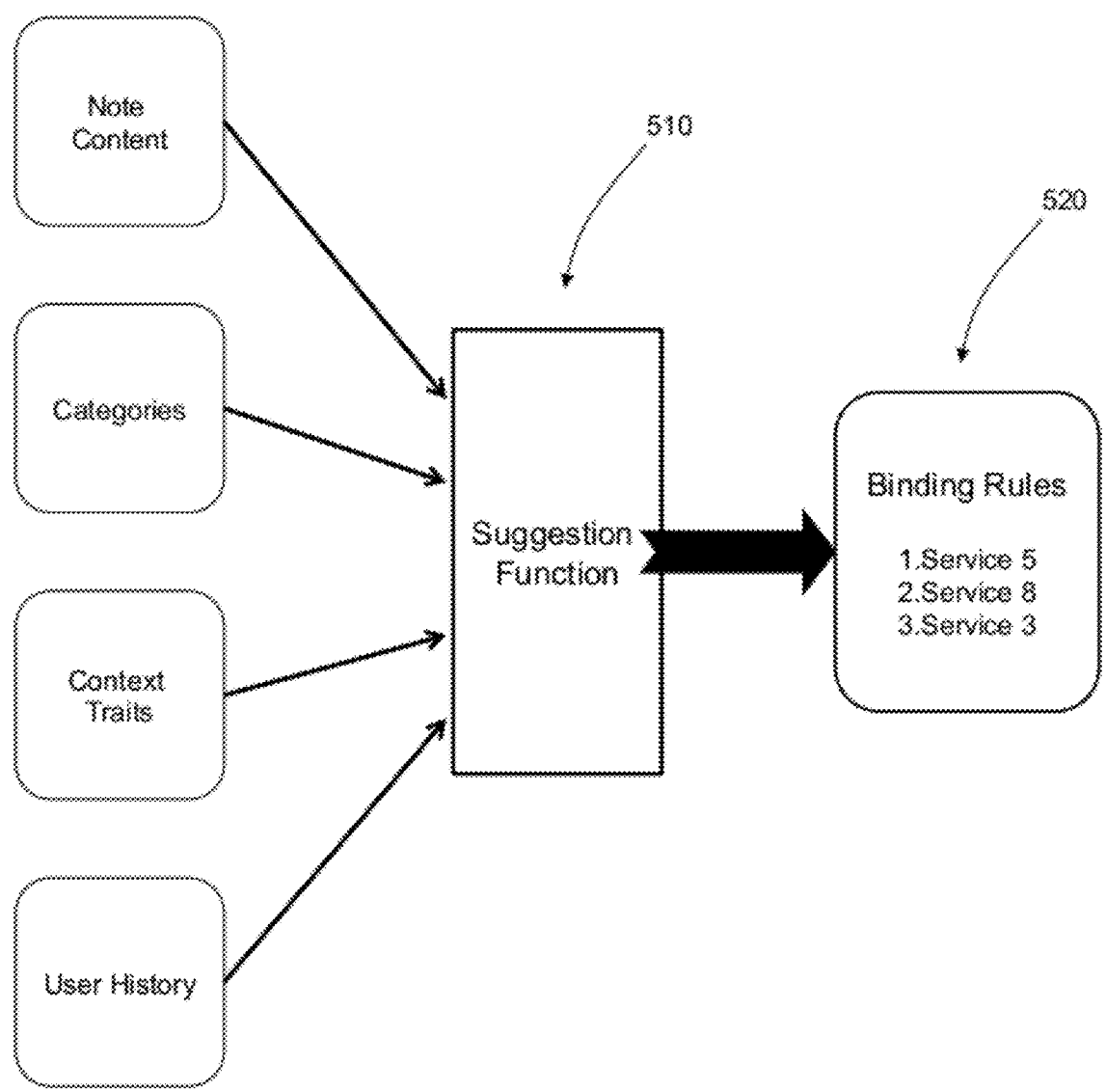
FIG. 5 shows an example of a suggestion function according to the present invention.

FIGS. 3 and 4 also include the steps of suggesting binding rules and receiving suggestions, respectively. The application server operates a suggestion function for suggesting one or more services where the note can be bound to the user who created the note. FIG. 5 shows the inputs for the suggestion function 510, which can include the content of the note, the categories of the note, the context traits, and/or the user history. Based on these inputs, the suggestion function 510 suggests binding rules 520, such as a list of suggested services where the note can be bound. For example, FIG. 5 shows a ranked list of services with "Service 5" being the top-ranked service where the note can be bound.

In an embodiment, the suggested services or binding rules are selectable by the user, where the user selection binds the note to the selected service. User selections can be stored for reference by the suggestion function. For example, a first note is created by a user, labeled with "Category 4", and bound to "Service 5" by user selection. Because of this user selection, "Service 5" would be suggested for a second note also labeled with "Category 4". It is noted that the first and second notes can be created by the same user, or they can be created by different users. In other words, the suggestion function 510 can rely on the user history of the same user or the user history of a community of users. It is noted that the association of a service to a category is mutable and evolvable depending on user behavior. For example, though "Category 4" and "Service 5" are associated in the above example, the association of services for "Category 4" could change to "Service 3" if users frequently alter the selection from "Service 5" to "Service 3" for notes having a label of "Category 4".

In an embodiment, a note is automatically bound to one of the suggested services without user selection. In a preferred embodiment, the storage of past user selections enables intelligent and automatic binding of notes to services. Automatic binding of notes to services reduces the need for user input.

The suggestion function 510 is also capable of suggesting categories to label a note in addition to or replacement of suggesting binding rules. Suggestions of categories can be analogous to the suggestions of services described in the previous paragraphs. In particular, suggestions of categories can be based on the content of the note, the context traits of the note, other categories of the note, a user history, the binding rules established for the note, the services determined by the binding rules, or any combination thereof. For example, a note contains a description of a product. Based on this note content, a category named "product" is suggested to the user for labeling the note. In another example, the association of a service and a category based on a user history can be used to suggest one or more categories for notes having binding rules with that particular service. In an embodiment, a note is automatically labeled with one or more suggested categories.

Figure 6:
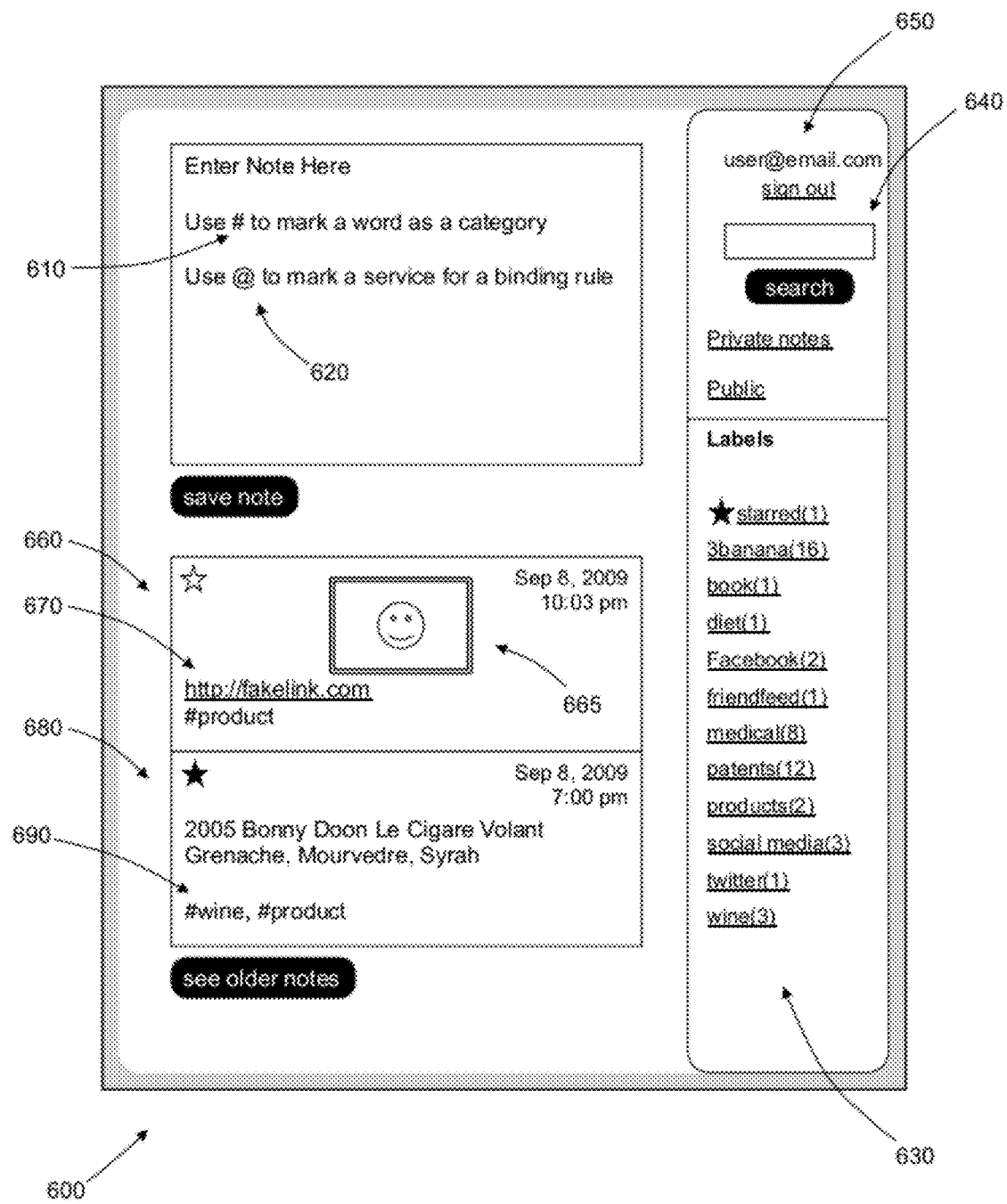
FIG. 6 shows an example user interface for semantic note taking according to the present invention.

FIG. 6 shows an example user interface 600 for user creation of a note and user entry of categories and binding rules for the note. In an embodiment, the user interface 600 is accessible via a web browser. However, alternative methods of accessing user interfaces known in the art may also be used. In a preferred embodiment, the user interface 600 allows user entry of a first symbol 610 to designate entry of a category and a second symbol 620 to designate entry of a binding rule. As shown in FIG. 6, the first symbol 610 is the "#" sign and categorization is accomplished by placing a "#" symbol adjacent to a word. Similarly, the second symbol 620 is the "@" sign to mark a service for a binding rule. The first 610 and second 620 symbols allow easy entry of categories and binding rules. As can be appreciated by one or ordinary skill in the art, the present invention is not limited to the use of symbols for categorization and binding rules.

In a preferred embodiment, entry of the first symbol 610 triggers a list of previously used categories to be displayed to the user. In particular, the list can be filtered to only include categories that may be relevant to the note, such as based on the content of the note or the context traits of the note. In an embodiment, users can override suggestions and label the note with non-suggested category or a new category. Similarly, entry of the second symbol 620 triggers a list of services or binding rules to be displayed to the user. In a preferred embodiment, user selection of a category to label the note triggers a display of suggested services where the note can be bound. Conversely, user selection of a binding rule triggers a display of suggested categories to label the note. The suggestions can be based on previously stored user selections, i.e. a user history, or any other bases as described herein with respect to the suggestion function.

The user interface 600 also includes a list of categories 630 used in all stored notes. A user can select a category from the list 630 to view notes labeled with the selected category. In an embodiment, a search box 640 is also available to find previously saved notes. FIG. 6 also shows previously saved notes 660 and 680. The note 660 includes a photo 665 and a weblink 670. The note 680 includes text description of a wine and is labeled 690 with the categories "wine" and "product" by use of the first symbol. The user interface 600 also includes a user name 650, such as the user's email address. In an embodiment, the application server requires a user authentication to access the semantic note taking system.

Embodiments of the present invention are also directed to user interfaces corresponding to services to facilitate simple collection of data and binding to services. In an embodiment, a user interface is provided for each of the services where a note can be bound. The user interface corresponding to a particular service includes one or more buttons for initiating an action specific to that service. Service specific user interfaces are referred to as semantic skins. In a preferred embodiment, a single click of a button on a semantic skin initiates the creation of a note, automatic content generation and addition to the note, automatic labeling of the note with one or more categories appropriate to the service, and communication of the note to the service.

Figure 7A:
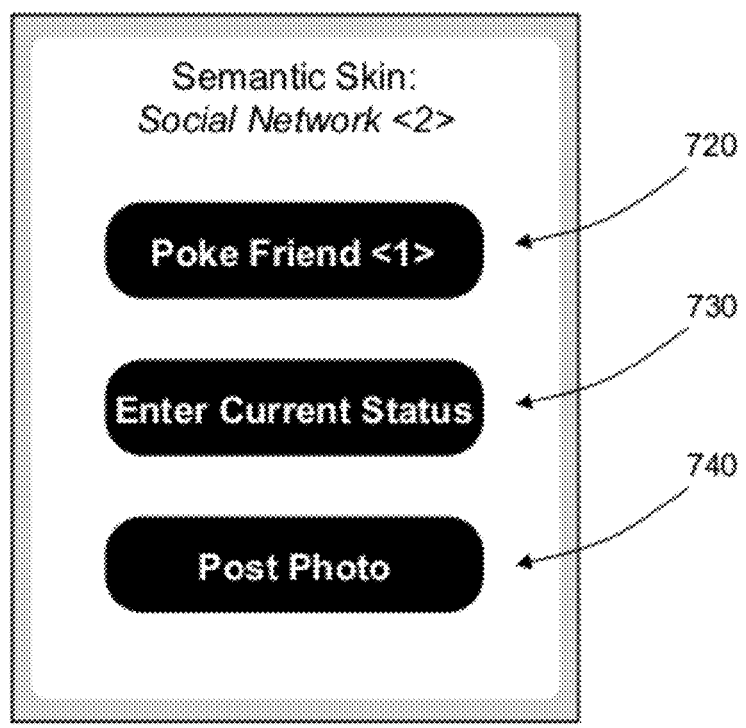
FIGS. 7A-B show examples of semantic skin user interfaces corresponding to services according to the present invention.
Figure 7B:
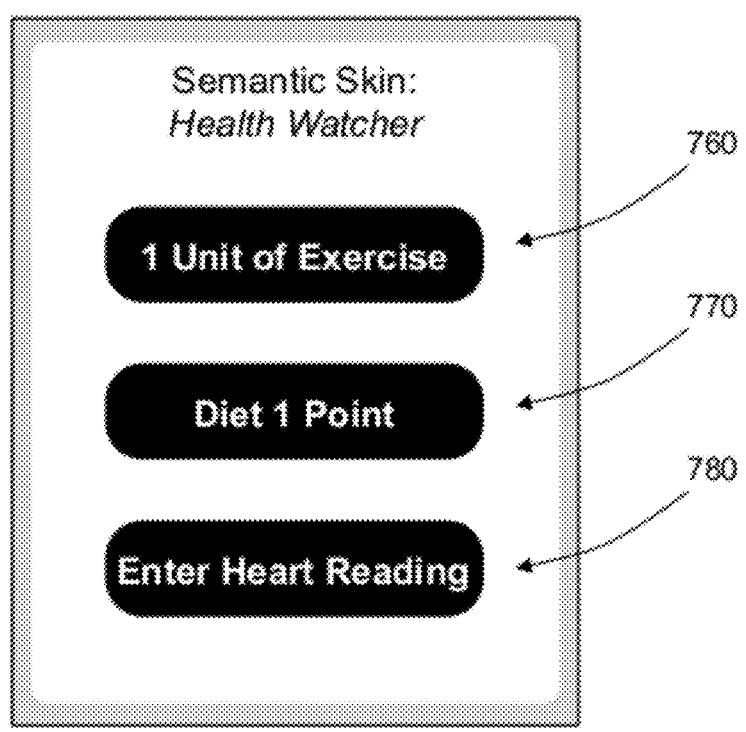

FIG. 7A shows an example of a semantic skin 710 for a social network service and FIG. 7B shows an example of a semantic skin 750 for a health or diet application. The semantic skin 710 includes a button 720 to "poke" a friend of the user in the social network, a button 730 to submit the current status of the user, and a button 740 to post a photo to the social network. The semantic skin 750 in the example shown by FIG. 7B includes a button 760 to enter exercise activity, a button 770 to enter diet information, and a button 780 to measure medical readings. The semantic skins can rely on context traits derived from the device where the data entry is performed. For example, the button 730 of semantic skin 710 can utilize the current location of the user as measured by the user device and publish that location to the social network. In another example, a user is operating a device that includes a heart monitor and the button 780 extracts heart rate measurements, attaches the measurements to a note, and communicates the note to a health service.

In a preferred embodiment, buttons in user interfaces and semantic skins are programmable. The buttons serve the purpose of providing simple or single click entry of data and minimizes the friction for a user to collect information and bind the information to services.

FIGS. 8-11 include details of a functional embodiment of the present invention. The exemplary embodiment shown in FIGS. 8-11 are directed to social network services, such as Facebook.com and Twitter.com, though its extension to other services can be appreciated by one of ordinary skill in the art. The present invention is not limited to the embodiment of FIGS. 8-11; alternatives to the services and applications described in FIGS. 8-11 can be identified by one of ordinary skill in the art.

Figure 8:
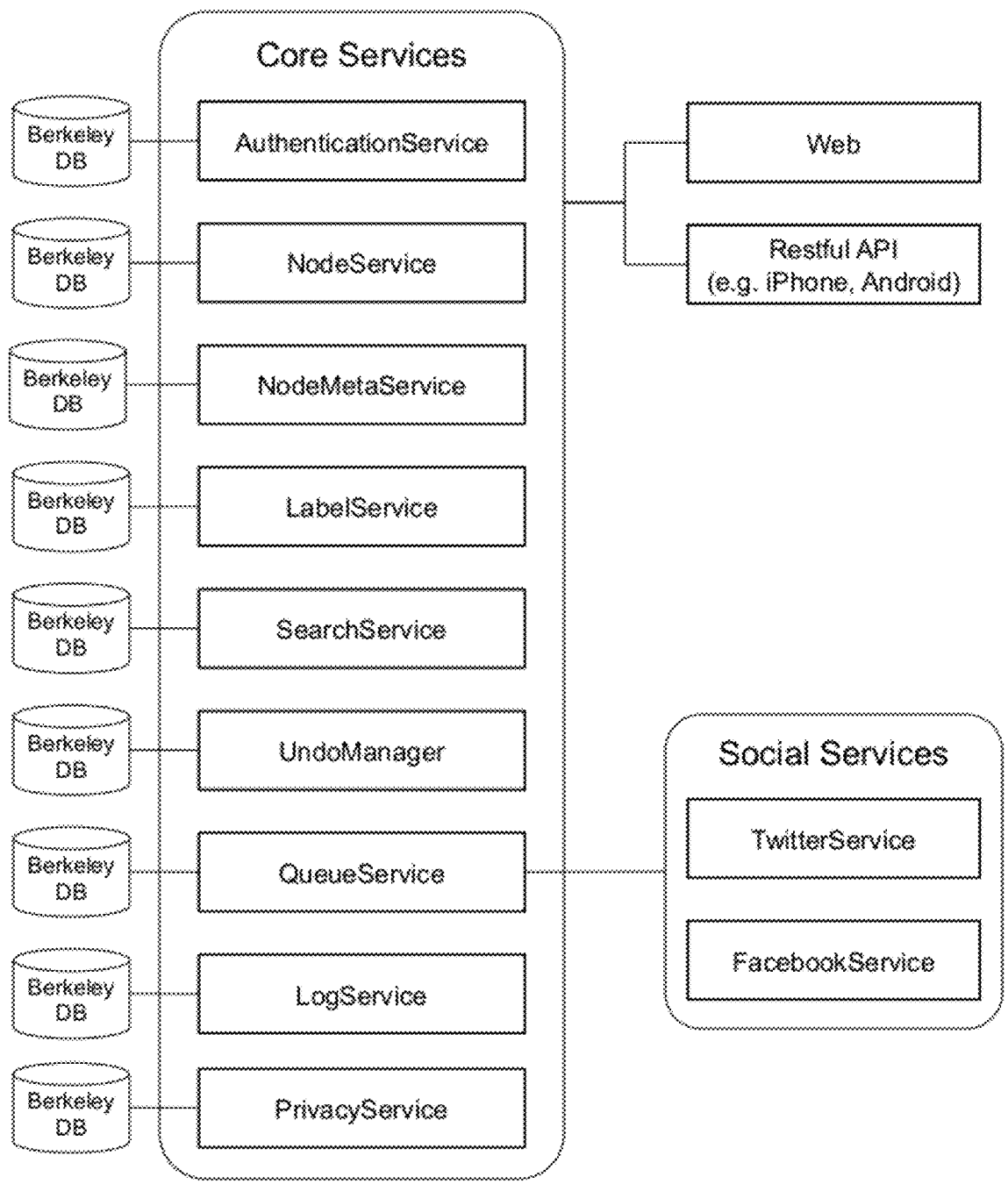
FIG. 8 shows the core services of an exemplary embodiment of the present invention.
Figure 9:
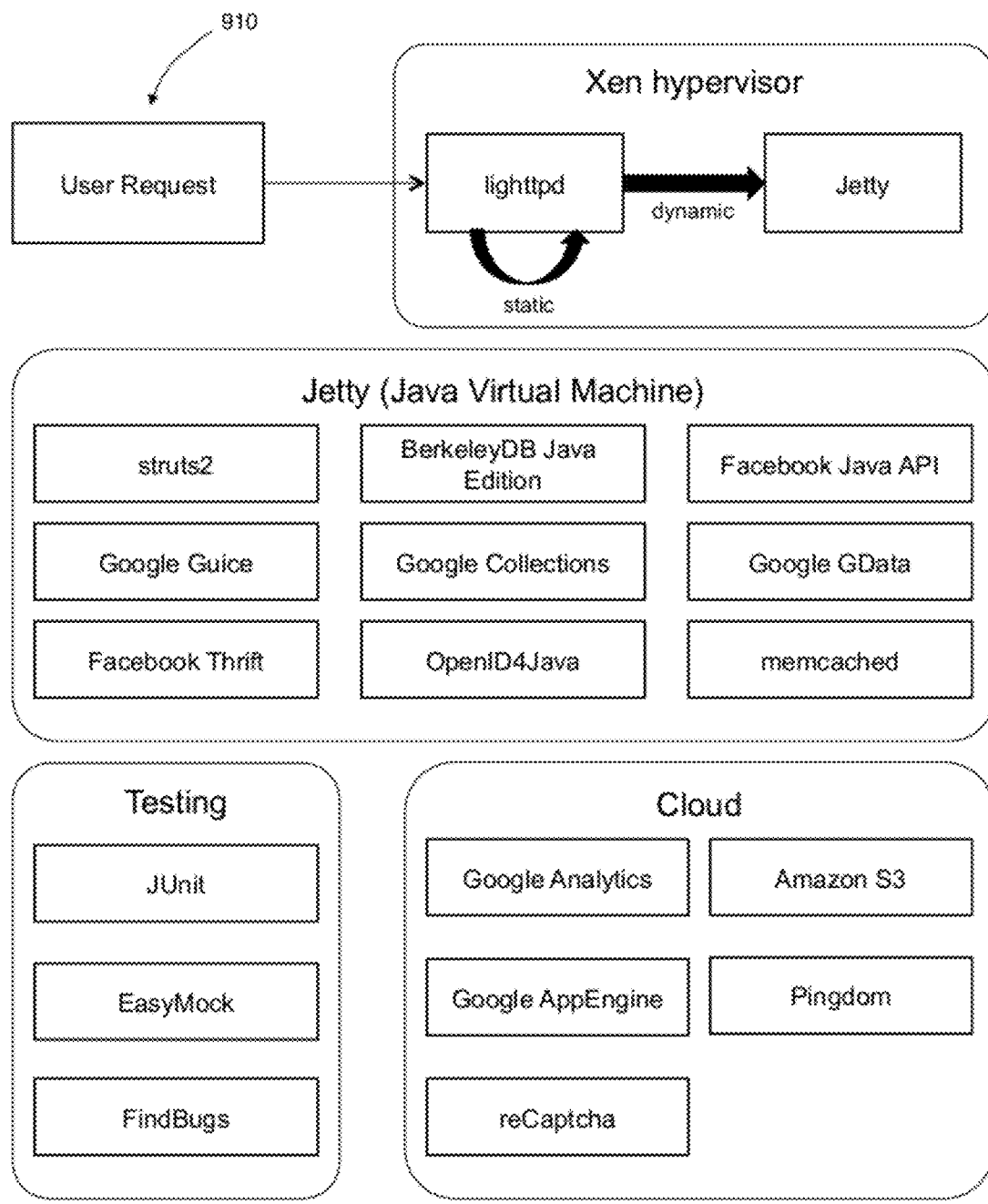
FIG. 9 shows the technology services underlying the core services shown in FIG. 8.

FIGS. 8-9 show the technologies used by the application server in an exemplary embodiment of the present invention. The core services are shown by FIG. 8 and include the AuthenticationService, NodeService, NodeMetaService, LabelService, SearchService, UndoManager, QueueService, LogService, and PrivacyService. Each of the core services has its own instance of a BerkeleyDB Java Edition as a backing store. FIG. 9 shows an initial user request 910 that is handled by a web server, e.g. lighttpd. Lighttpd serves up all the static content. If the request is for dynamic content then it is forwarded to the Jetty Java Application Server. Jetty runs inside of the Java Virtual Machine. In the embodiment shown in FIG. 9, the struts2 web framework is used inside of Jetty. Struts2 determines which services are needed to fulfill the request and uses Google Guice to create all the objects needed by the user. After all the objects have been created, struts2 fulfills the users request and generates the page. The jQuery JavaScript library is used to speed up and simplify cross-platform development. Google collections Library is used to augment the standard Java collections.

Figure 10:
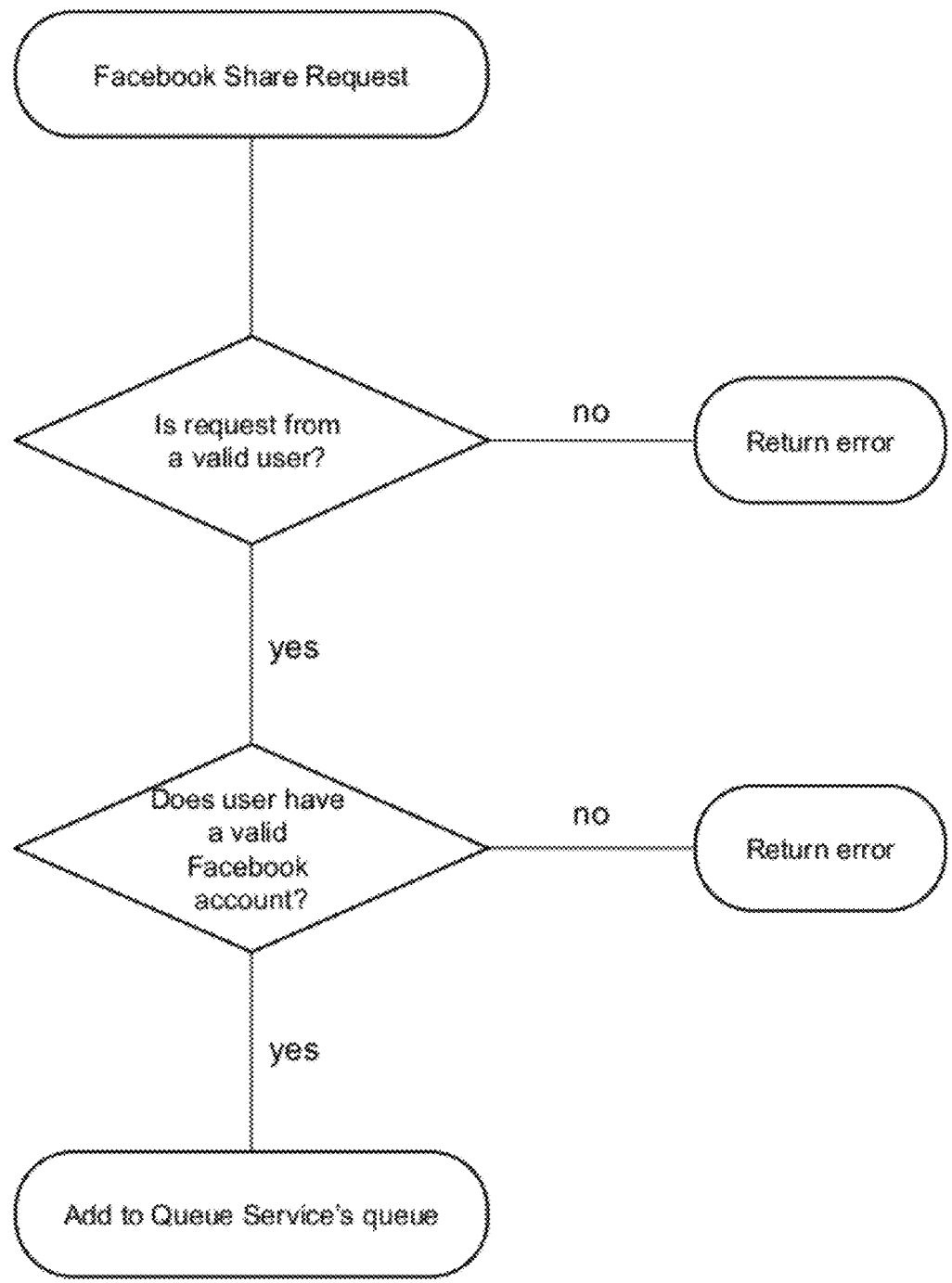
FIG. 10 shows a flow chart of an example login and authentication function in an exemplary embodiment of the present invention.

FIG. 10 shows a flow chart related to the AuthenticationService of an exemplary embodiment of the present invention. The AuthenticationService allows a user to communicate with any service that requires authentication or login information; thereby the semantic note taking system can be integrated with any number of third party applications and services. In the example shown in FIG. 10, a user request to share a note on Facebook is shown. The request is handled by struts2, which checks if the user is a valid user of the semantic note taking system. If the request is from a valid user, a request is sent to the FacebookService to verify if the user has valid Facebook credentials. If the user has a valid Facebook account, the request is sent to the QueueService to en-queue the Facebook share request.

Figure 11:
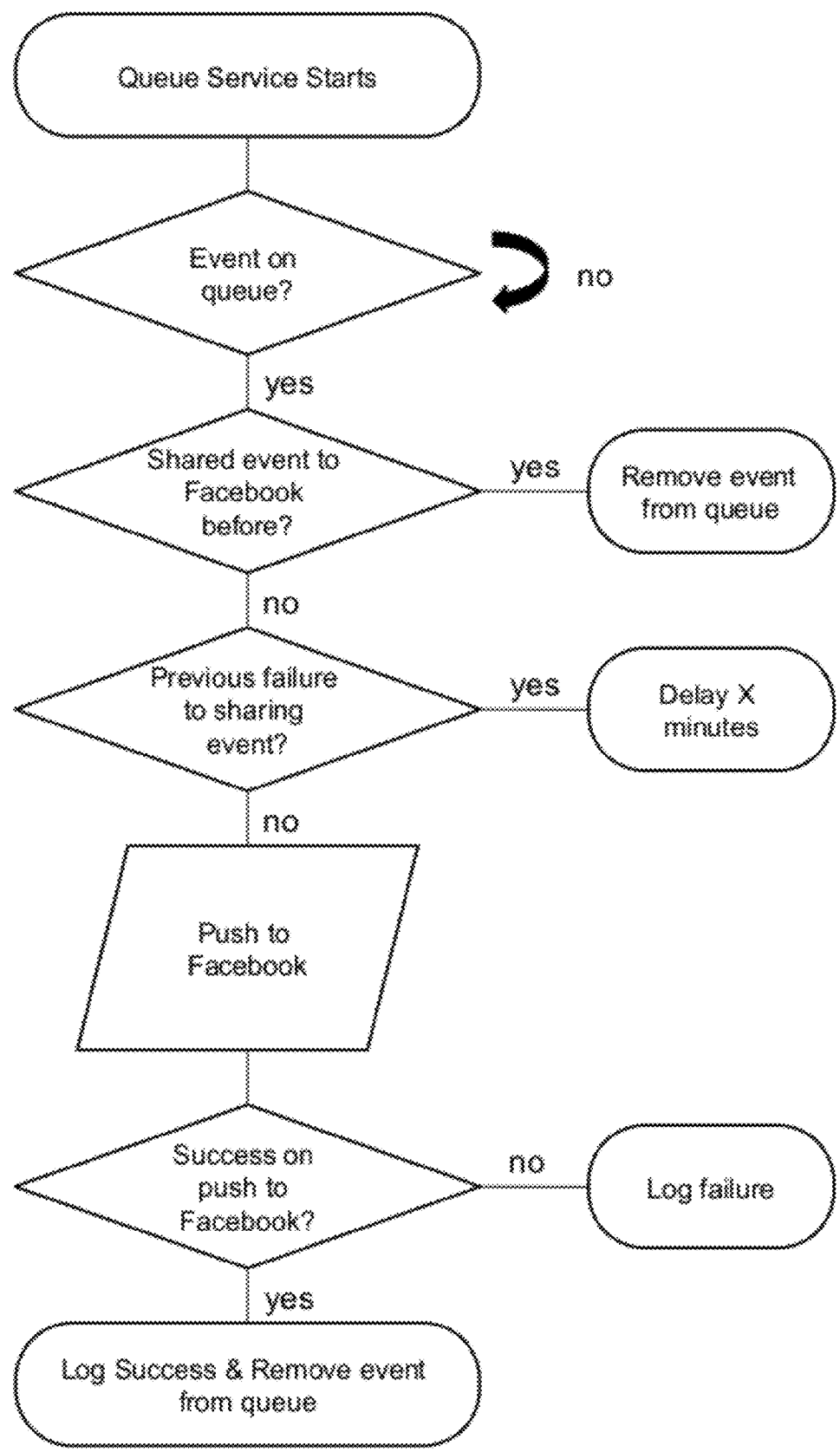
FIG. 11 shows a flow chart of an example Queue service in an exemplary embodiment of the present invention.

FIG. 11 shows a flow chart related to an embodiment of the QueueService. When an event is en-queued in the QueueService's queue, the QueueService checks if the note associated with that event has been previously shared to Facebook. The LogService tracks when a note has been successfully shared to Facebook. If the note has been previously successfully shared, it is removed from the queue. The QueueService then checks if there was a problem sharing the note. If the note has had a failure, the share event is timed out and put back in the queue to be run after X minutes. The note is then pushed to the user's Facebook account. The note is pushed by the QueueService calling the FacebookService to fulfill the share request. If the request succeeds, the event is removed from the QueueService's queue and logged to LogService.

EXAMPLES

The following examples demonstrate exemplary applications for the embodiments of the present invention. It is noted that applications for the present invention are not limited by these examples; other applications of the present invention can be identified by one of ordinary skill in the art.

Example 1

Product Review

A user enjoys a product, such as a glass of wine. During a dinner engagement The user jots down information related to the wine, such as the brand, vintage, variety, etc., by accessing a user interface to the semantic note taking system. The note includes a label of "#wine" for future reference to the note. Context traits, including the GPS coordinates where the note was created is associated with the note. Using the GPS coordinates and accessing a directory information module, the name of the restaurant is derived and automatically associated with the note. The note is saved in the database.

At a later date, the user chooses to discuss the wine with friends of the user who may be wine enthusiasts. By binding the wine review note to a social network or an email application, the note is communicated to one or more friends of the user. One of the friends writes a brief review of the wine and attaches that review to the note. After the note has been shared to friends of the user, the user decides to write a wine review to be posted on a wine website. The user refines the note and binds it to the wine review website to be published to the world.

Example 2

Retail

Figure 12A:
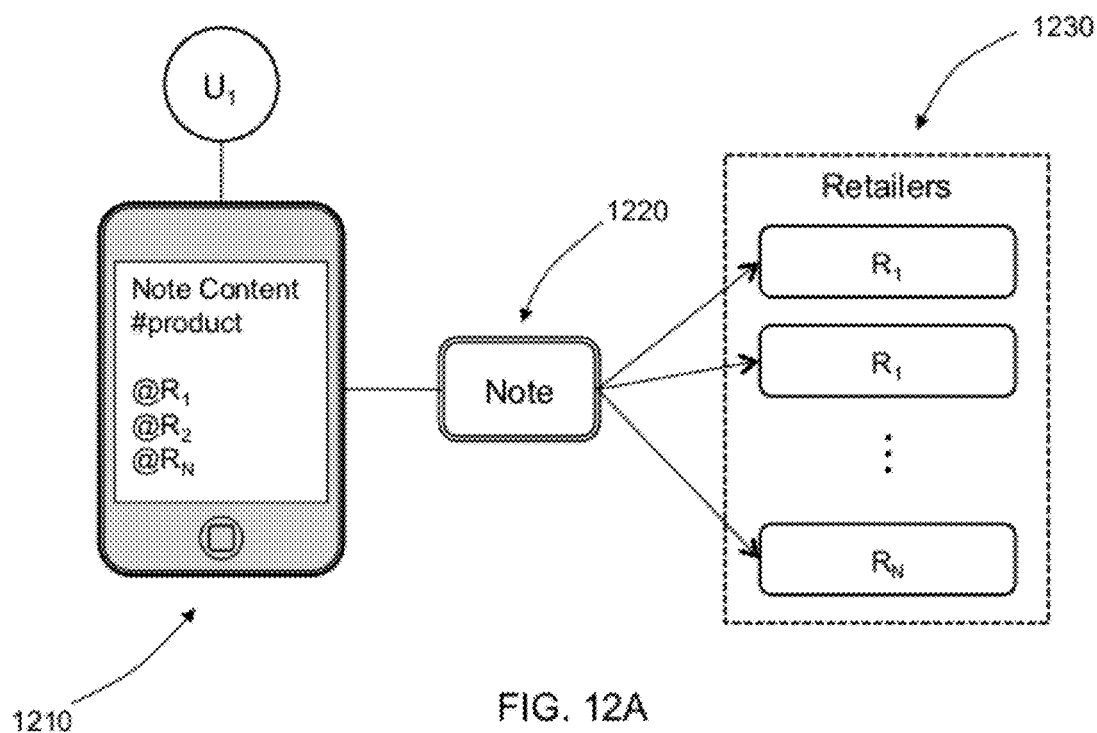
FIG. 12 shows an example of using semantic note taking with online retailers according to the present invention.
Figure 12B:
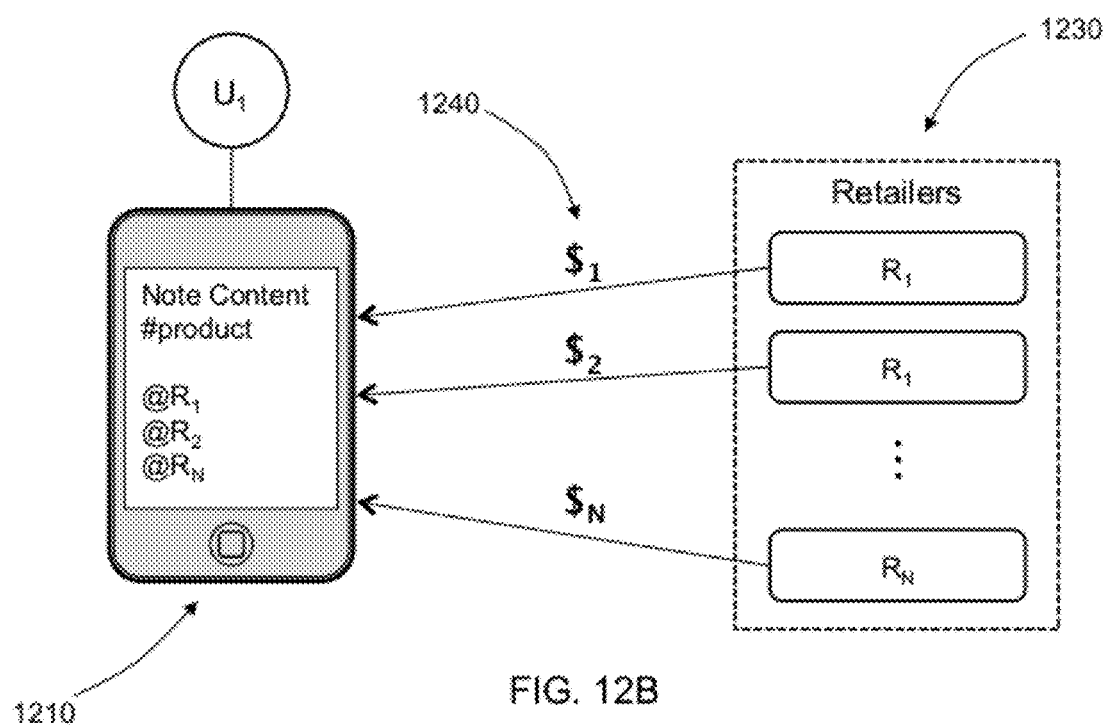

FIGS. 12A-B show an example of a retail application with bidding from multiple online retailers 1230. In FIG. 12A, user $U_1$ creates a note 1220 on a user device 1210. The note 1220 includes an identification of a product and binding rules that indicate it is to be bound to retailers $R_1$, $R_2$, and $R_N$. The note 1220 is communicated to the retailers $R_1$, $R_2$, and $R_N$ based on the binding rules. After the note 1220 is received by the retailers $R_1$, $R_2$, and $R_N$, the retailers send offers 1240 to user $U_1$ for the product described in the note 1220. Alternatively or additionally, the retailers $R_1$, $R_2$, and $R_N$ can send advertisements, coupons, or any information relating to the product to the user $U_1$.

Example 3

Health

The present invention can be directed to a dietary, health, or medical service. For example, with minimal friction, a user can submit his or her dietary behavior to be tracked by a diet service. In another example, medical information can be collected at a hospital visit or doctor's appointment and submitted to an electronic medical record (EMR) application.

Example 4

Research

The semantic note taking system of the present invention can also be applied to a research study. In an embodiment of the present invention, research data is collected in a note. The research data can be collected from the field via a mobile device. The research data is enriched with time and location context traits. For repetitive data collection, a semantic skin would provide simple one click user entry of data. For example, the present invention can facilitate frictionless data gathering from door-to-door surveys. A door-to-door surveyor would need not enter the address of each participant of the survey as location context traits would be automatically associated with the note. Relevant data (e.g. resident names and demographics) can be automatically accessed based on the location context traits.

Additional Embodiment(s)

Figure 13:
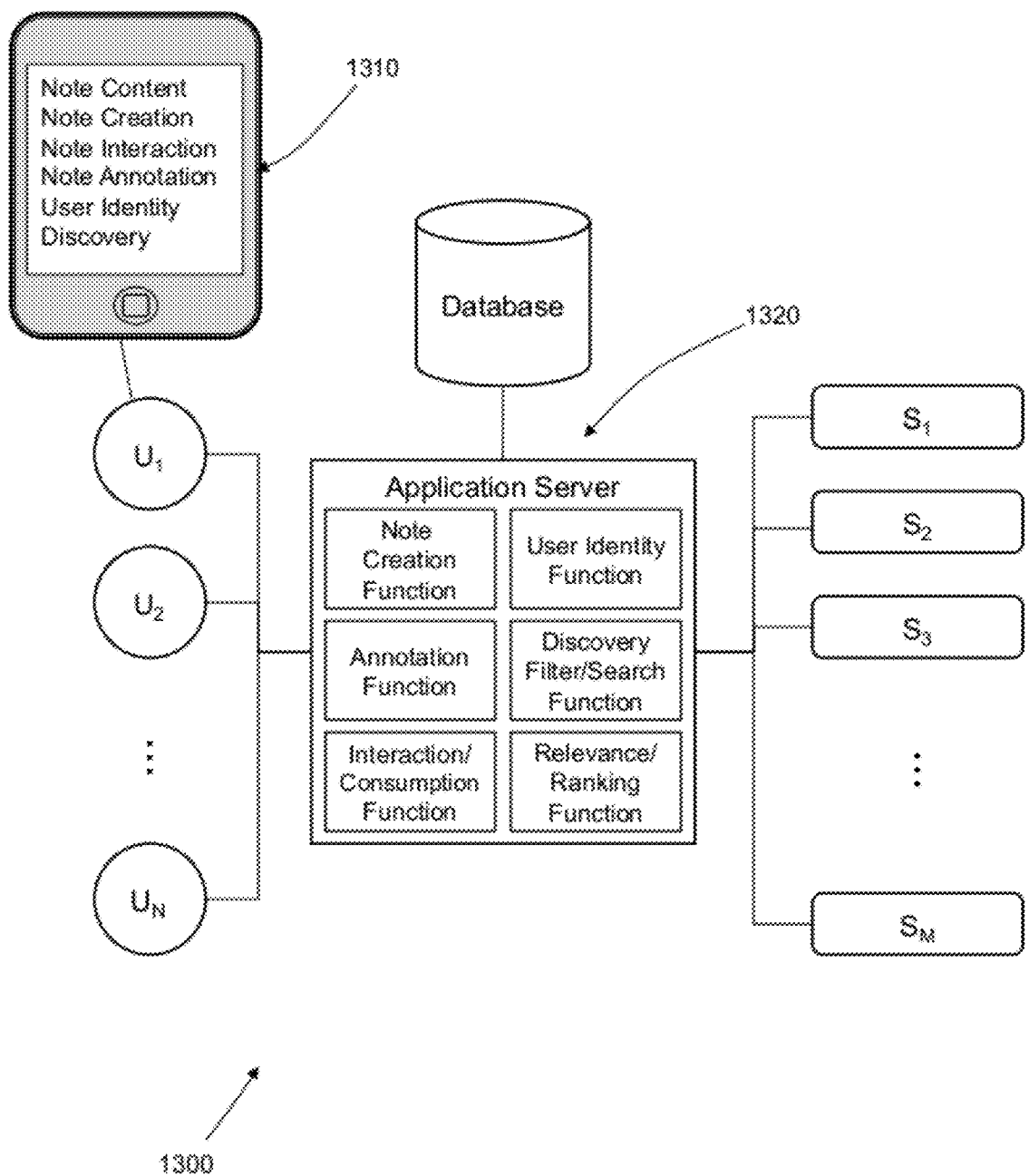
FIG. 13 shows an example of a information collection and discovery system 1300 based on augmented user identity according to the present invention.

FIGS. 13-20 show examples of one or more additional embodiments, which can be used in conjunction with one or more or the other teachings described herein or by itself as a method or system. FIG. 13 shows an embodiment of a system 1300 according to the present invention. The system 1300 includes an application server 1320 that is accessible by a plurality of users $U_1$-$U_N$ for, among other things, creating one or more notes, categorizing the notes, interacting with notes, identifying user identity traits, augmenting user identity traits to notes, and binding the notes to one or more services $S_1$-$S_M$. The users $U_1$-$U_N$ connect to the application server 1320 through any device capable of being communicatively connected to a network, such as the Internet. The user devices can include a computer, a laptop, a personal digital assistant (PDA), a cell phone, a mobile device, or a smart phone. FIG. 13 shows user $U_1$ with a mobile phone 1310 that is connected to the application server 1320, such as through a wireless network.

These additional embodiments, referred to as Compass by Catch.com, intend to help you capture and create content that matters to you and discover pre-existing content from your history, friends, and the public (notes and/or Cloud information). Content that one creates is tagged with rich context and identity annotations. Content one discovers is filtered by the same set of context and identity parameters. The result is the first integration of private memory and history with shared and public content, with strong relevance filtering.

Augmented user identity is used to annotate user content and to filter third party content. The user interaction with content creation and consumption functions contributes to an evolving and changing augmented user identity that includes both the user profile and the time-based feeds of content creation and consumption.

Such embodiments solve the current fragmentation in content management where different channels are optimized for private, shared, and public content, enabling a context-aware, intention-based unified view. Rich context-awareness is enabled by cloud-based Smartphone implementation not previously accessible or possible.

The following description addresses different aspects of the invention. Further examples or additional teachings related to embodiments of this invention are described in U.S. patent application Ser. No. 12/924,094 filed Sep. 20, 2010 (Context-Aware Prompts and Alerts in a Note-Sharing System), U.S. patent application Ser. No. 12/802,740 filed Jun. 11, 2010 (Semantic Note Enriching System), U.S. patent application Ser. No. 12/381,594 filed Mar. 13, 2009 (Semantic Note Taking System), and U.S. patent application Ser. No. 12/322,046 filed Jan. 27, 2009 (Semantic Note Taking System), which are all hereby incorporated by reference for all that they teach.

Augmented Identity

The following description relates to aspects or processes of an augmented identity. For example:

Identity—The current profile at this moment in time, which for example relates to:
    Your relationships
    Your interests
    Your personal history What you capture—A chronological stream of all information you record combined with all possible context associated with current environment and your intention, which for example relates to:
    Personal experiences, places, ideas, notes, content curation.
    Shared content, selectively from your personal content.
        Friends
        Groups and communities
        Based on profile and context
    Public, data published for all the world to see.

What you discover—A chronological stream of all information that you consume or view, filtered by your context, identity, and intention, which for example relates to:
    From your own prior recording of notes, ideas, experiences, places, and curation.
    From people or groups with whom you have a relationship or connection.
    From published data available to the general public.

With respect to "What you Capture", a Smartphone can capture nearly everything, so the challenge is knowing what data matters. All captured data is annotated with context, from for example, your surroundings & sensor data, your history & past experiences, and/or your interests & relationships. Each unit of information will carry annotations with all available context.

With respect to "What You Discover", it is a challenge knowing how to filter for relevance, especially with the explosion of data. Discoverable data can be filtered based on context. Examples of filtering based on context are based on surroundings and sensor data, based on history and past experiences, and/or based on interests and relationships. Filtering is accomplished by matching identity and profile data with contextual annotations.

The kind of problems for the Compass App and the Catch system to solve are for example:

Enhanced Memory
    What have I done or thought around here?
    What have I done or thought with these people?
    What have I done or thought in this context?

Enhanced connection with friends by discovering shared experiences and interests Enhanced discovery of new people & ideas Who would I enjoy meeting?
Who would enjoy meeting me?
What are our shared interests?.

Figure 14:
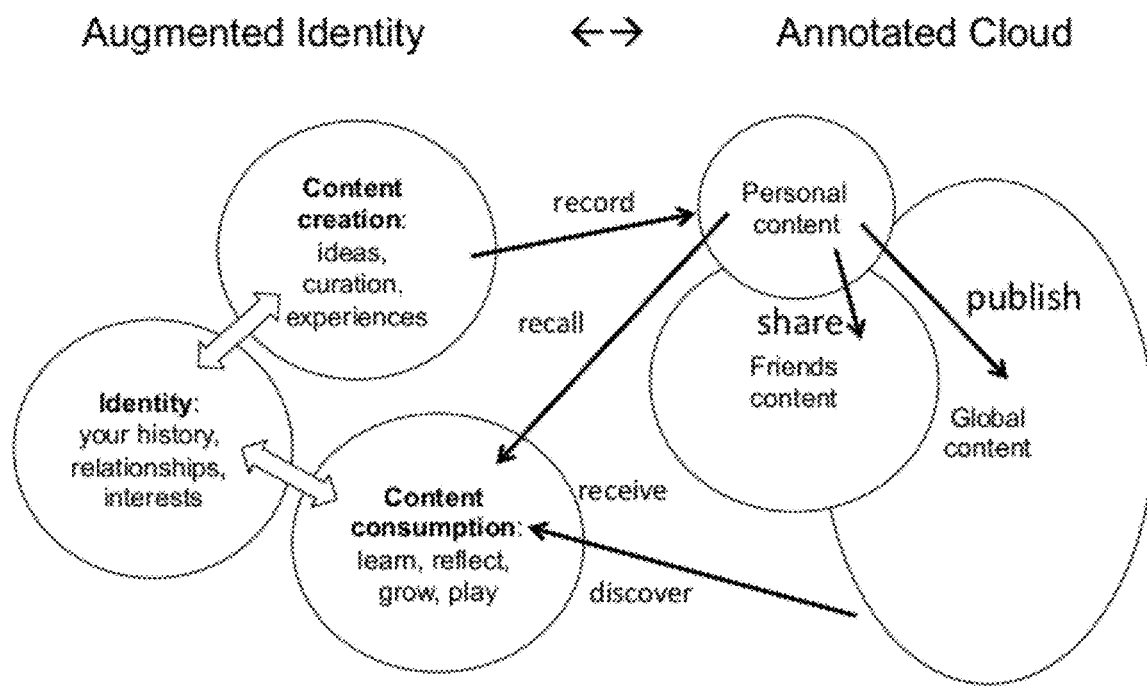
FIG. 14 shows an example according to the present invention of a process of augmenting user identity using components of user's action and interaction with content (private notes, shared notes and/or public notes) and/or Cloud information (private, shared or public/global) accessible via the Internet.

FIG. 14 shows an example of components, according to an exemplary embodiment of the invention, of an individual action and interaction with content in the cloud. The augmented identity interaction with cloud content can be explained by the following examples.

- Identity contains of your history, your relationships, your interests.
- Identity is continuously augmented and updated based on the content you create and consume, which becomes part of your history and leads to an evolution of your interests and relationships over time.
- Content creation and content consumption are chronological streams of "notes" annotated by contextual data including data derived from people, places, and events associated with that content.
- The content creation stream may include all of the artifacts of your brain in space and time that are recorded, together with contextual data from your current environment.
- The content creation stream starts as private space so that recording can be uninhibited. Subsets of this content can be shared later: Sharing properties are a result of late binding.
- Late binding makes subsets of your content creation available to subgroups of friends, specific communities, or published to the world.
- The content you create carries with it all contextual data available from your current environment plus all the profile data that you are willing to attach, so that others may discover and filter your content for relevance. These properties can be automated through privacy rules.
- Content consumption is an enhanced search function that ranks available content based on best match to your identity (history, relationships, interests) and your current context (location, environment, current activities, current intentions)
- Currently, Facebook is optimized for sharing and receiving from friends, Twitter is optimized for publishing and discovering public content, and Catch is optimized for recording and recalling private information.
- Compass integrates the three spheres of private, shared, and public content by late-binding sharing properties after creation, annotating all content with context and identity, and enabling discover of relevant content based on matching the annotations of available content with your identity and current context.

In the current ecosystem, there are gaps regarding the lack of effective integration of private, shared and public space. For example, In Facebook information is shared with friends and received from friends. There is a lack of a private story. There is a tendency for people to put on their "public face" as they manage their own identity.

Twitter, Wordpress, Tumblr, Posterous, Blogger global content is published and information is discovered from the world. There is a lack of effective relevance filters based on identity. These systems work only for truly public content and requires an internal editor.

Catch captures and recalls private content. There are no inhibitions because content is personal and private. People can selectively share and publish, but there is no discovery path of the captured content.

In the Compass solution, according to embodiments of the invention, content capture and content consumption is integrated with identity. Content capture (e.g. video, sound, text, sensor data) is done in context to record all available contextual data as annotations to the content. Connection to identity is part of context: Shared content carries with it a link to shared profile data of content source. Content consumption is based on filtering available data from self, friends, and world based on current context. Profile data (interests, relationships, history) is used as a content filter to rank for relevance.

In a solution example,
Rather than this:
"Who was here?"
"Who is here?"
"What experiences were captured here?"
Embodiments of the invention would discover this:
"Which of my friends where here and what did they do that might be of interest to me now?"
"What other information around here might have come from people who share my interests and history?"
"Can I discover and connect with new people and ideas that will resonate with me based on my history, my interests, and my current relationships?"

Figure 15:
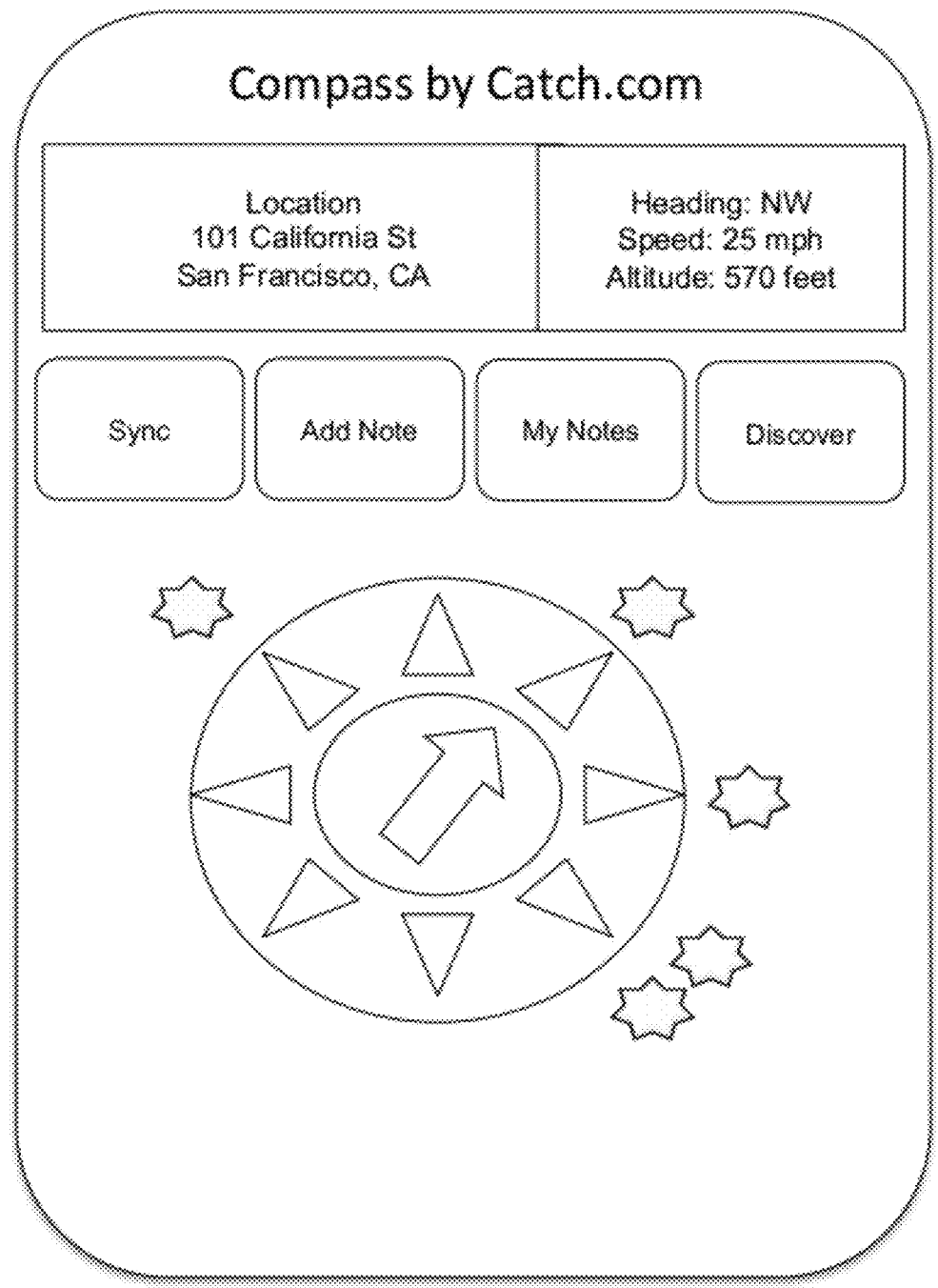
FIG. 15 shows an example of a Compass application on a user device according to the present invention

FIG. 15 shows an example of a Compass App home screen, with the following features.

- Displays current location resolved to address or known place. Geo coordinates can resolve to user places list, which also can be imported or resolved through places and check-ins in other services including Facebook, Foursquare, phone services.
- Displays additional context including native sensor data, data derived from sensor data, and data referenced from sensor data over the network, including heading, speed, altitude, pitch, roll, vibration, temperature, daylight.
- Also can include sensor data obtained from user devices including heart rate, temperature, blood pressure.
- "Sync" button synchronizes locally stored data and cloud stored data, including user notes and nearby data.
- "Add Note" button brings user to screen to capture text, image, sound, video, and storing all note annotations that include all available contextual data.
- "My Notes" brings user to screen that displays user notes ranked by a combination of context, identity, and intention.
- Discover brings user to a screen with a series of tabs with ranked public notes and shared data from friends. Data is ranked based on context, preferences, user intentions, user identity, user relationships.
- Examples of feeds in Discover can include commerce opportunities (Groupon deals, coupons, discounts) as well as location-tagged public content (Wikipedia, Yelp review, Yellow Pages, Geocaching locations, points of interest).
- Filters for Discover can be set by user in settings, including data source such as friends, subgroups of friends, communities, as well as interests and history.

Figure 16:
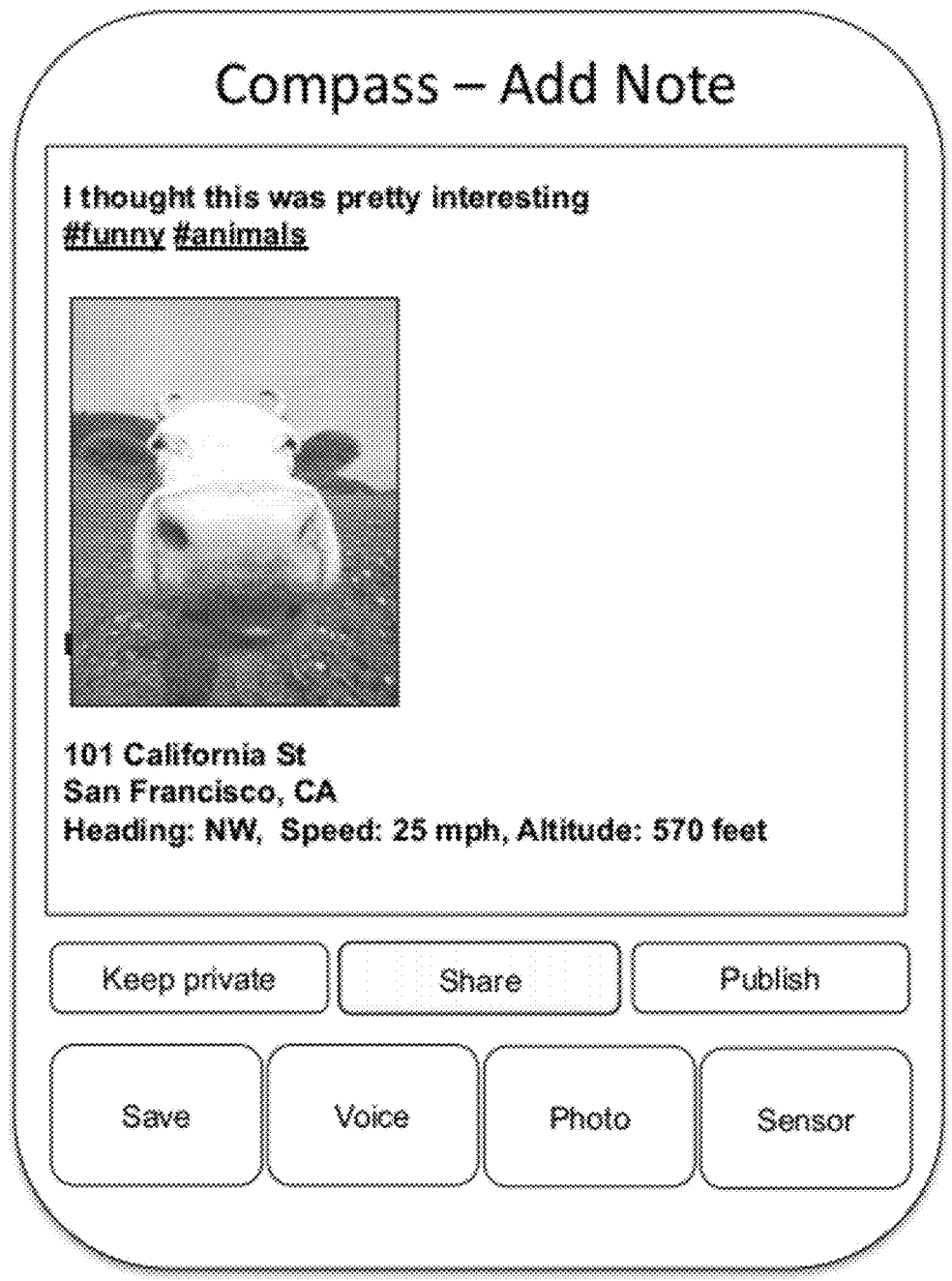
FIG. 16 shows an example of a note creation using a Compass application on a user device according to the present invention.

FIG. 16 shows an example of adding a Note on the Compass App, with the following features.

- Free text entry screen for notes.
- You can add images/video, voice/sound, and sensor data to the note.
- Hashtags: any word with a # in front of it becomes a tag and a link to other notes with same tag.
- Sensor data and any other available is appended to the note as a hidden and machine readable annotation.
- Context data may also be human readable depending on user preference.
- You may decide to keep content private, share or publish.

Share brings user to additional settings and preferences to determine how, with whom, and for how long content can be shared.

Examples of share settings include share to Facebook, share to specific group of friends on Facebook, create a secret URL for content or just share content, append identity data or not.

Publish also includes options for how much identity and context data to include.

Publication properties can be saved preferences and can be automated.

Voice, photo and sensor data can include pre-processing by services to extract data, convert speech to text, and interpret sensor data by sending to third party services and receiving back a processed data element.

Examples include OCR, bar code scanning, conversion of raw sensor data into parameters meaningful to user, like resolving GPS coordinates to a predefined place.

Figure 17:
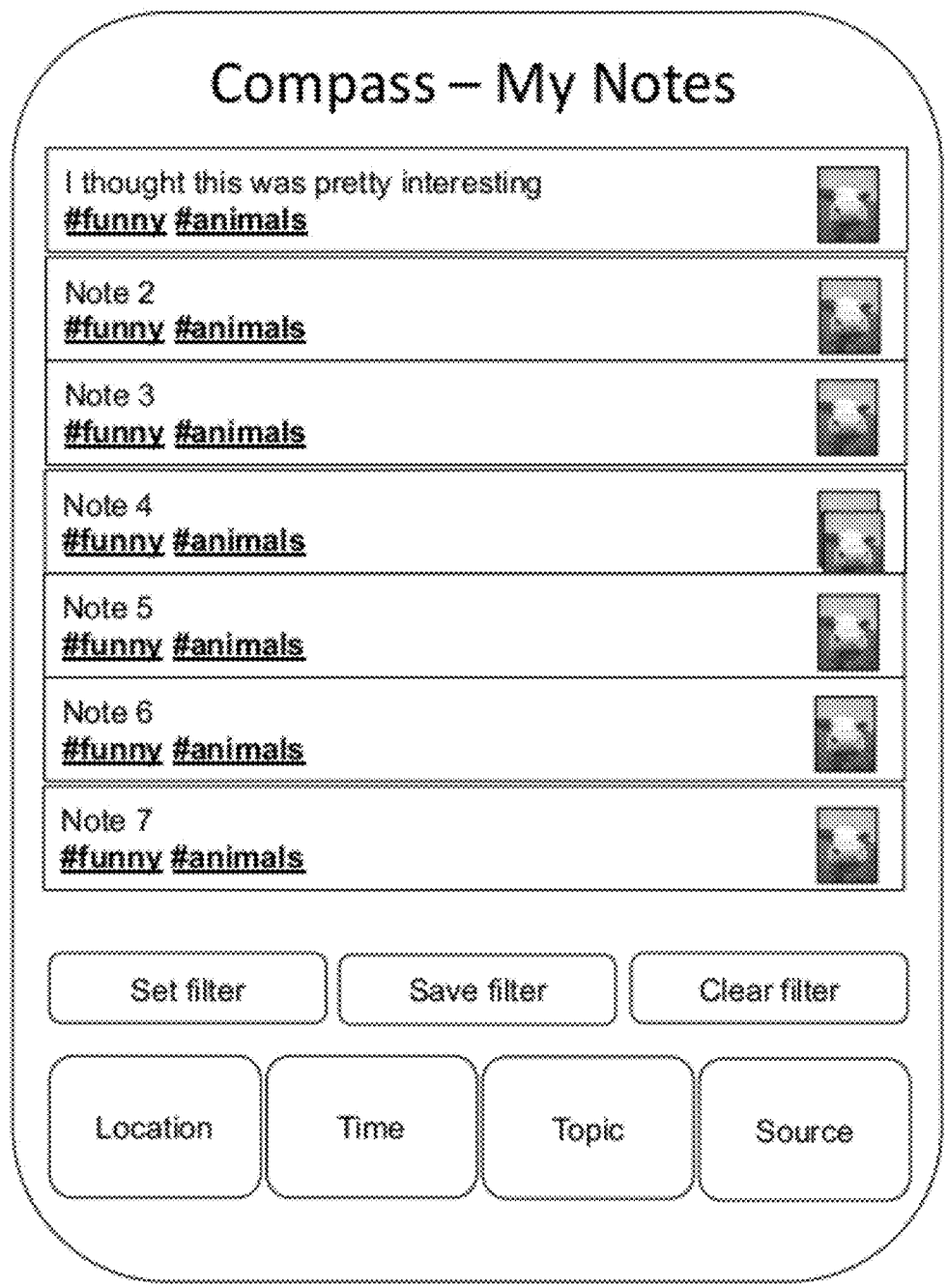
FIG. 17 shows an example of a user's notes using a Compass application according to the present invention.

FIG. 17 shows an example of "My Notes" on the Compass App, with the following features.

Chronological feed of content I have created, captured or saved.

Notes from list expand into single note and editor view when clicked.

Filters can be created by user based on any available contextual data.

Default filters are location, time/event, topic/hashtag, and source.

Source can mean the original content generator if the user captured, saved or curated third party content.

Filters can combine multiple attributes and can be saved like a saved search.

Users can scroll through searches by flicking the bar at the bottom to the left or right.

Figure 18:
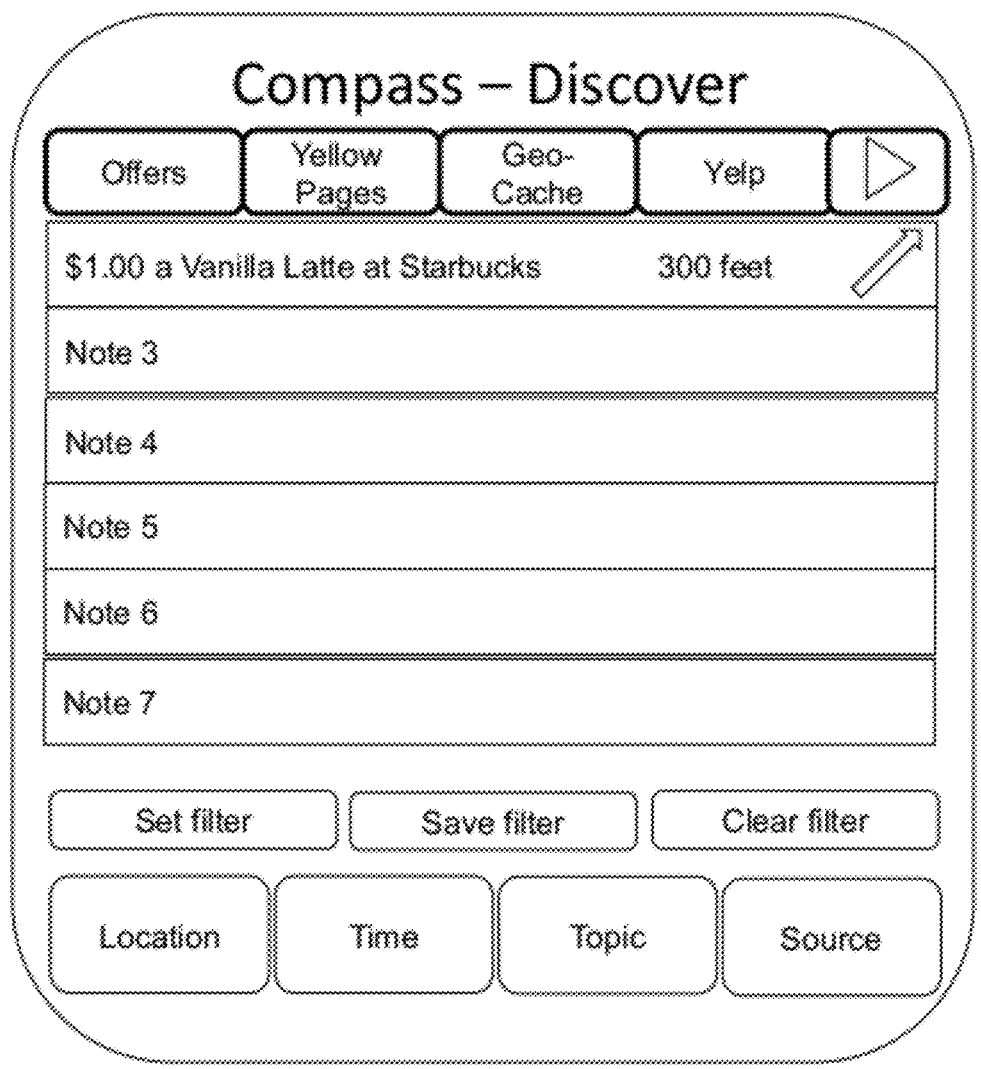
FIG. 18 shows an example of a discovery of notes using a Compass application according to the present invention. The example also show services (e.g. Offers, Yellow Pages, Geo-Cache, Yelp, Starbuck) bound to the discovered note.

FIG. 18 shows an example of the Compass App Discovery Function, with the following features.

Tabs at the top indicate specific source feeds.

Third party channels of location-based or context-filtered data includes sources like Groupon Offers, Yellow Pages, Geo-Caches, Yelp listings, Wikipedia entries that include geo-tags, housing or rental listings, published notes from Catch, Checkins from Facebook or Foursquare.

Feeds also can be comprised of public notes or shared notes from friends, friends of friends, communities, or shared data from people with similar interests or histories.

Many services can be added depending on their ability to share data through an open API.

Users can scroll through available feeds on top bar, and can add or select feeds to show in settings.

Users can capture data from the public discovery feeds into their own notebook, at which time the copy or link to the source becomes considered curated private data.

Each time users capture or record data from the public feeds, the user's contextual data and shared identity data is added as an annotation in the user's notebook.

Figure 19:
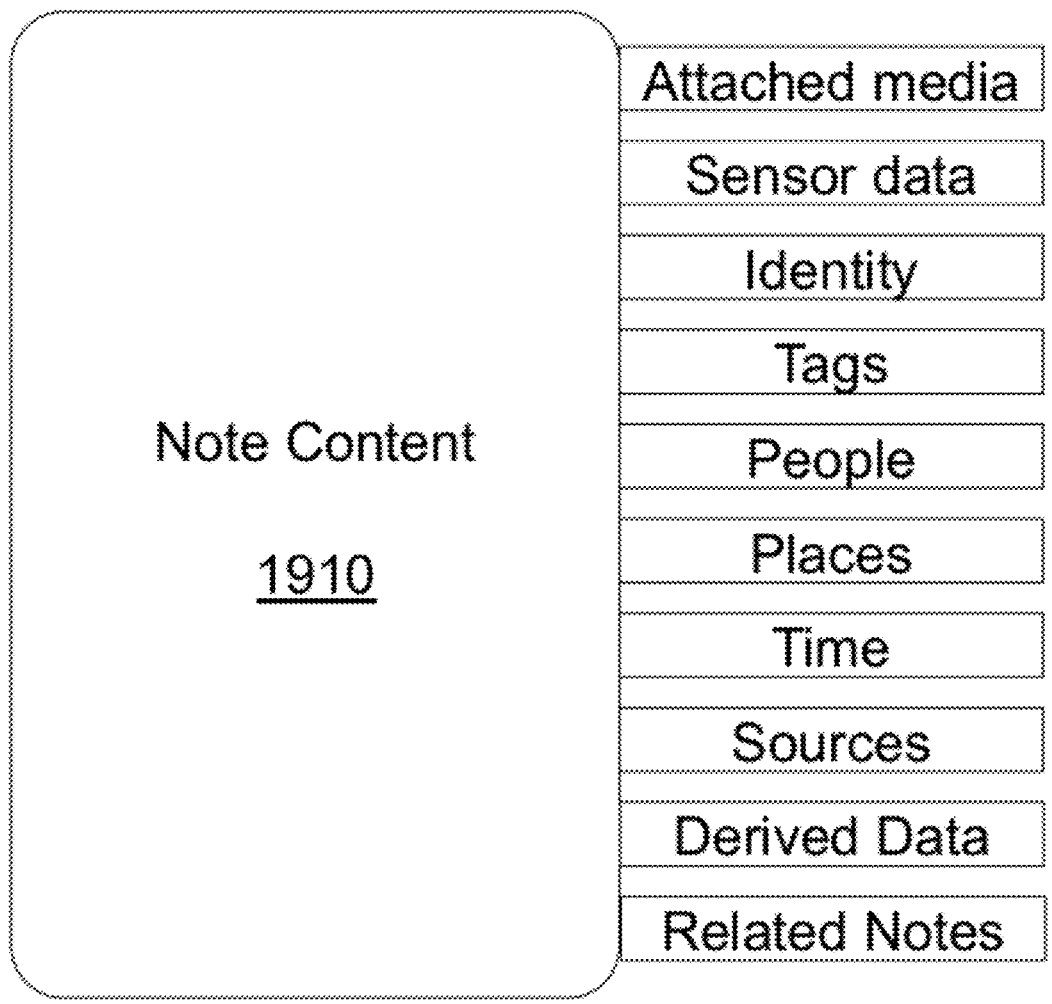
FIG. 19 shows an example of a note content 1910 according to the present invention.

FIG. 19 shows an example of a Note as the fundamental building block in the Compass App, with the following features.

Note content is the original note text.

Attached media can include multiple images, video, sound, or links to media files.

Identity includes the user identity and any shared data from the augmented user profile.

Tags represent user intention and start with hashtags within user entered text or user selected tags from a tag list.

People are the other identities that the user associates with the note.

Places are either captured by the Smartphone GPS or by user selection and association.

Time is a timestamp from the Smartphone, but can also include modification times or user selected time or event information.

Sources include original sources of data for user curated or saved information from public content.

Derived data is the result of an external service processing the note and adding information to the note.

Examples of derived data can mean: OCR generated text from an image, speech to text, identification and extraction of entities from the text such as names, places, or any proper noun.

Any note can contain links to related notes, creating a web of associated information.

Figure 20:
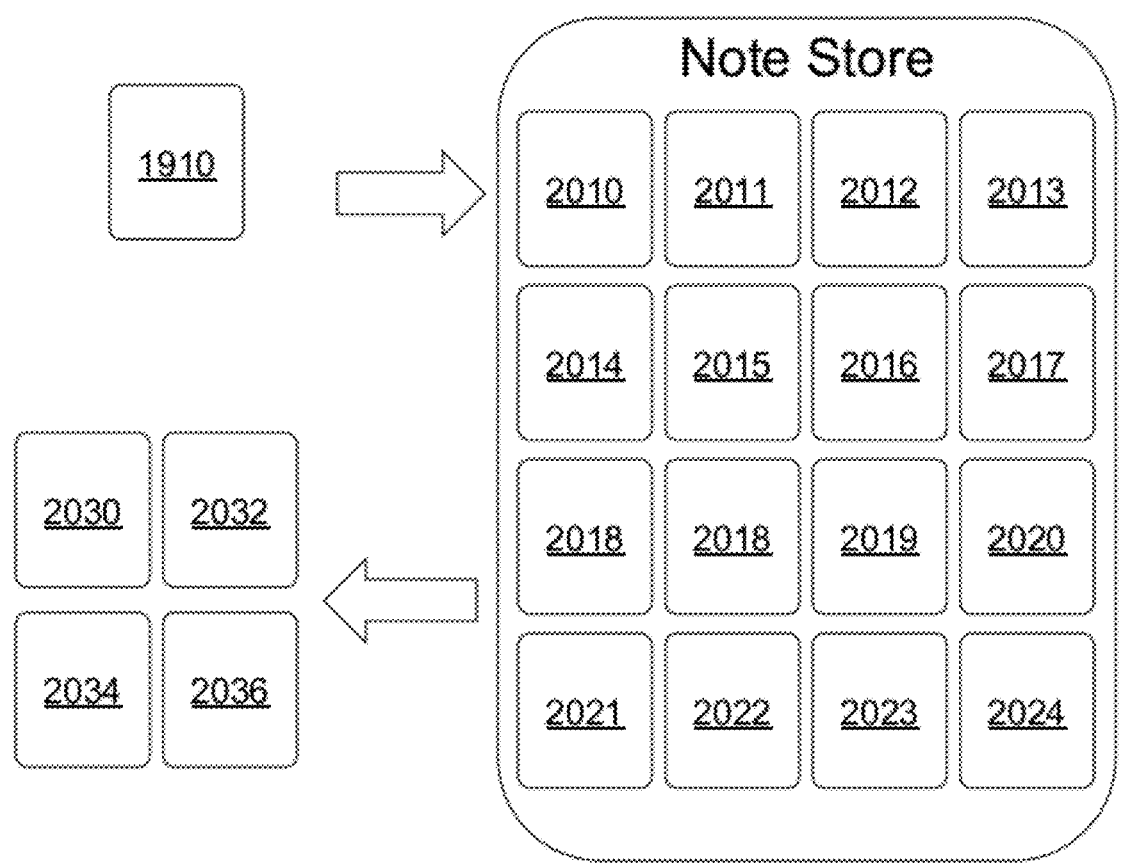
FIG. 20 shows an example according to the present invention of a note discovery process where notes 2030, 2032, 2034, 2036 are discovered from note database/store (with notes 2010, . . . 2024) based on annotations of note 1910 as shown in FIG. 19 as well as augmented user identity traits (not shown in FIG. 20).

FIG. 20 shows an example of a Note Discovery process in the Compass App to find related notes based on annotations to the starting note. An example of the discovery process is as follows.

Each unit of information is considered a note with annotations comprised of contextual data and linkages.

Note Store is a schema-less database or big table.

When a users intentionally searches for something, or when a user simply presses the "discover" button, this also is an act of note creation of the basic note that says: I am here and I am interested in discovering something.

The user's current intention or query can be expressed as a note carrying the same contextual and identity data as any other note.

When a note is used to query the note store, the search results is based on best fit with contextual data.

The result can be parsed into a series of different streams that the user can choose from based on interests and intentions.

The best fit algorithm is a ranking based on the difference or distance between the annotations of the query note and the annotations of the notes in the Note Store.

One or more examples of the invention can be embodied as computer software or computer-implemented methods operable on computer devices and/or systems, especially mobile devices or Smart phones. One or more examples of the invention can also be embodied as a system integrating Smart phones, mobile devices, computer servers for data storage and/or processing, data communication systems and/or the Internet. As one of ordinary skill in the art will appreciate, various changes, substitutions, and alterations could be made or otherwise implemented without departing from the principles of the present invention, e.g. notes can be communicated to any service capable of being connected to the network, and any network, such as a WAN or LAN, can be used in addition to or in replacement of the Internet. Accordingly, the scope of the invention should be determined by the following claims and their legal equivalents.

What is claimed is:

1. A method comprising:

receiving, by a server, from a first user device, a first note created by a first user of the first user device, the first note annotated with first contextual data describing a first geographic location at which the first user created the first note;

identifying, by the server, a user profile associated with the first user, the user profile including a first set of identity traits describing the first user;

annotating, by the server, to the first note, a first identity trait of the first set of identity traits describing the first user;

identifying, by the server, a second note created by a second user that may be of interest to the first user, the second note annotated with second contextual data describing a second geographic location at which the second user created the second note, and a second identity trait describing the second user, the second noted identified by:

determining that the second geographic location is within a predetermined distance of the first geographic location, and determining that the second identity trait is similar to at least one identity trait included in the first set of identity traits describing the first user; and transmitting, by the server, the second note to the first user device to be presented to the first user.

2. The method of claim 1, further comprising:

identifying that the first note may be of interest to a third user, the first note identified by:

determining that the first geographic location is within a predetermined distance of a third geographic location at which the third user created a third note, and determining that the first identity trait is similar to at least one identity trait included in a second set of identity traits describing the third user; and transmitting the first note to a second user device to be presented to the third user.

3. The method of claim 1, wherein the notes comprise text, audio media, visual media, audio-visual media, recorded data, a weblink, a pointer to an information source, or any combination thereof.

4. The method of claim 1, wherein the identity traits comprises personal content, privacy content, content from friends, global or public content, terms related to discovery search or filtering, or any combination thereof.

5. The method of claim 1, further comprising:

suggesting a first service where the first note can be bound based at least partially on one or more note categories of the first note, one or more identity traits from the first set of identify traits, a content of the first note, a history of the first user, or any combination thereof.

6. The method of claim 5, further comprising:

automatically binding the first note to the first service.

7. The method of claim 1, wherein the first note is annotated with second contextual data describing one of: a place, a time, a source, a related note, a person, people, a group, a tag, an identity, sensor data, a media file, an audio file, physical data relating to the first user device, derived data, or any combination thereof.

8. The method of claim 1, wherein the first note is defined by the first user as either: a private note, a shared note to be shared among a group of friends over the Internet or a public note to be made publically available over said Internet.

9. A system comprising:

a computer processor; and a memory containing instructions that, when executed, cause the computer processor to:

receive, from a first user device, a first note created by a first user of the first user device, the first note annotated with first contextual data describing a first geographic location at which the first user created the first note;

identify a user profile associated with the first user, the user profile including a first set of identity traits describing the first user;

annotate, to the first note, a first identity trait of the first set of identity traits describing the first user;

identify a second note created by a second user that may be of interest to the first user, the second note annotated with second contextual data describing a second geographic location at which the second user created the second note, and a second identity trait describing the second user, the second noted identified by:

determining that the second geographic location is within a predetermined distance of the first geographic location, and determining that the second identity trait is similar to at least one identity trait included in the first set of identity traits describing the first user; and transmit, the second note to the first user device to be presented to the first user.

10. The system of claim 9, wherein the instructions further cause the computer processor to:

identify that the first note may be of interest to a third user, the first note identified by:

determining that the first geographic location is within a predetermined distance of a third geographic location at which the third user created a third note, and determining that the first identity trait is similar to at least one identity trait included in a second set of identity traits describing the third user; and transmit the first note to a second user device to be presented to the third user.

11. The system of claim 9, wherein the notes comprise text, audio media, visual media, audio-visual media, recorded data, a weblink, a pointer to an information source, or any combination thereof.

12. The system of claim 9, wherein the identity traits comprises personal content, privacy content, content from friends, global or public content, terms related to discovery search or filtering, or any combination thereof.

13. The system of claim 9, wherein the instructions further cause the computer processor to:

suggest a first service where the first note can be bound based at least partially on one or more note categories of the first note, one or more identity traits from the first set of identify traits, a content of the first note, a history of the first user, or any combination thereof.

14. The system of claim 13, wherein the instructions further cause the computer processor to:

automatically bind the first note to the first service.

15. The system of claim 9, wherein the first note is annotated with second contextual data describing one of: a place, a time, a source, a related note, a person, people, a group, a tag, an identity, sensor data, a media file, an audio file, physical data relating to the first user device, derived data, or any combination thereof.

16. The system of claim 9, wherein the first note is defined by the first user as either: a private note, a shared note to be shared among a group of friends over the Internet or a public note to be made publically available over said Internet.

\* \* \* \* \*